United States Patent [19]
Ichihashi et al.

[11] Patent Number: 5,903,262
[45] Date of Patent: May 11, 1999

[54] INTERACTIVE TELEVISION SYSTEM WITH SCRIPT INTERPRETER

[75] Inventors: Toru Ichihashi; Katsushi Shimamoto, both of Tokyo; Koji Aoki, Fukaya, all of Japan

[73] Assignee: Kabushiki Kaisha Toshiba, Kawasaki, Japan

[21] Appl. No.: 08/689,069

[22] Filed: Jul. 30, 1996

[30]  Foreign Application Priority Data

| | | | |
|---|---|---|---|
| Jul. 31, 1995 | [JP] | Japan | 7-194687 |
| Jul. 31, 1995 | [JP] | Japan | 7-194688 |
| Jul. 31, 1995 | [JP] | Japan | 7-194700 |
| Jul. 31, 1995 | [JP] | Japan | 7-195121 |
| Jul. 31, 1995 | [JP] | Japan | 7-195259 |
| Jul. 31, 1995 | [JP] | Japan | 7-195303 |

[51] Int. Cl.$^6$ ............................. A04N 7/10
[52] U.S. Cl. ................... 345/327; 348/7; 348/12
[58] Field of Search ............... 348/6, 7, 10, 12, 348/13, 472, 475, 477, 553, 562, 564, 906; 435/3.1, 4.1, 4.2, 5.1; 345/327; H04N 7/10, 7/12

[56]  References Cited

U.S. PATENT DOCUMENTS

| | | |
|---|---|---|
| 5,539,822 | 7/1996 | Lett ........................... 348/12 X |
| 5,541,662 | 7/1996 | Adams et al. ............... 348/13 X |
| 5,559,550 | 9/1996 | Mankovitz ..................... 348/6 |
| 5,635,978 | 6/1997 | Alten et al. ................... 348/7 |
| 5,734,413 | 3/1998 | Lappington et al. ......... 348/12 |

FOREIGN PATENT DOCUMENTS

| | | |
|---|---|---|
| 63412 | 9/1994 | Australia . |
| WO 90/13088 | 11/1990 | WIPO . |
| WO 93/07713 | 4/1993 | WIPO . |
| WO 94/13102 | 6/1994 | WIPO . |
| WO 94/29811 | 12/1994 | WIPO . |
| WO 96/17473 | 6/1996 | WIPO . |

*Primary Examiner*—Nathan Flynn
*Attorney, Agent, or Firm*—Oblon, Spivak, McClelland, Maier, & Neustadt, P.C.

[57] ABSTRACT

A broadcasting station transmits script for presenting plural types of additional information relating to main broadcast in a vertical blanking interval included in a video signal. A television receiver generates an additional information selecting screen for selecting arbitrary additional information from plural types of additional information by executing the script according to a request signal received from a television remote controller, and displays in part of a display screen. Reflecting a selection instruction signal received from the television remote controller on the additional information selection screen, the script is executed according to the selection instruction, and selected additional information is generated and displayed on a display screen in a display format conforming to the content of the information.

5 Claims, 27 Drawing Sheets

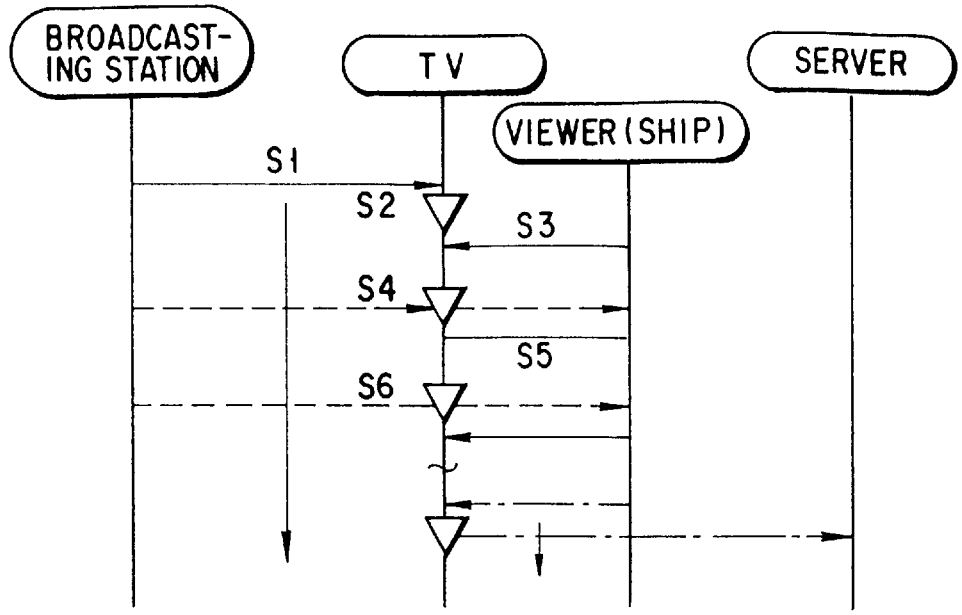
F I G. 2
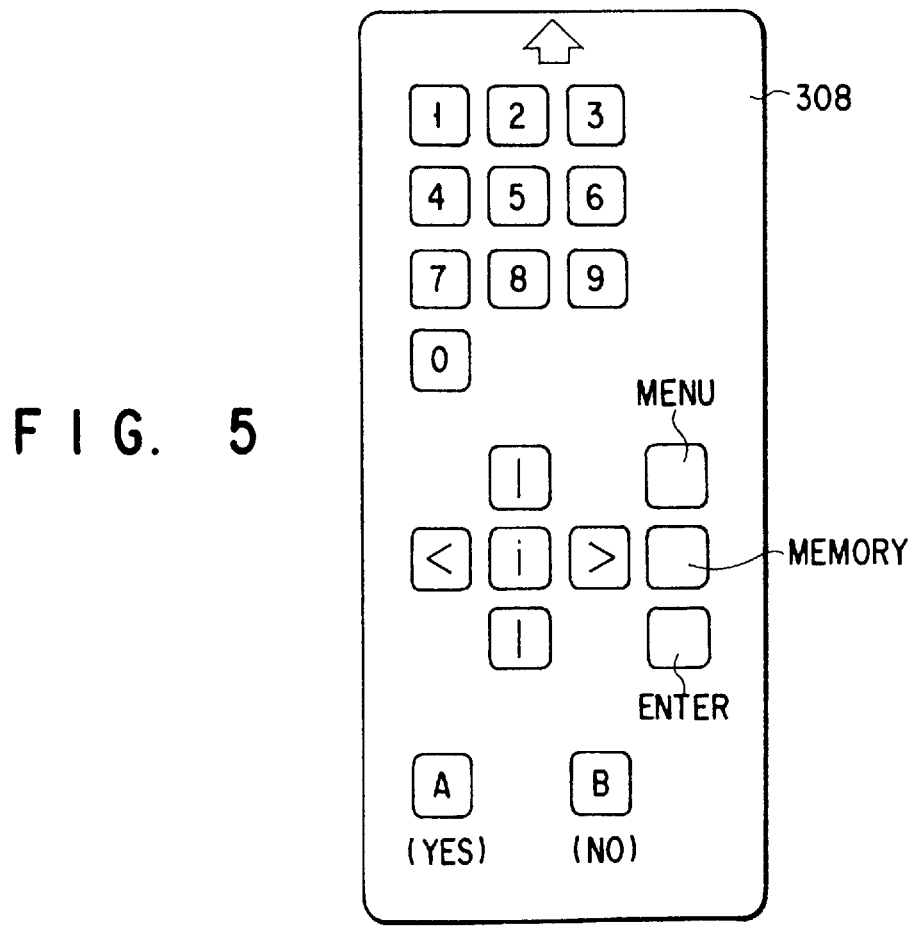
F I G. 5

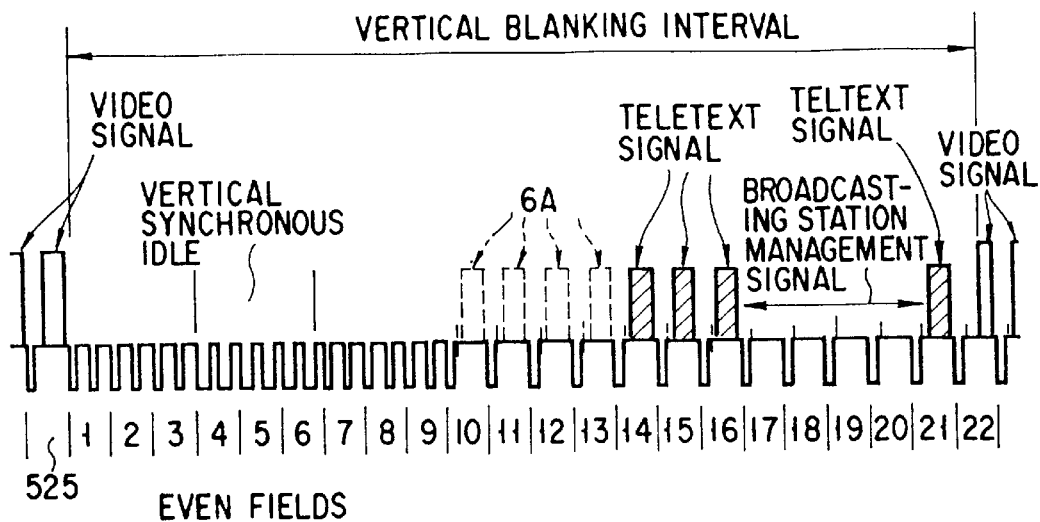
F I G. 6A
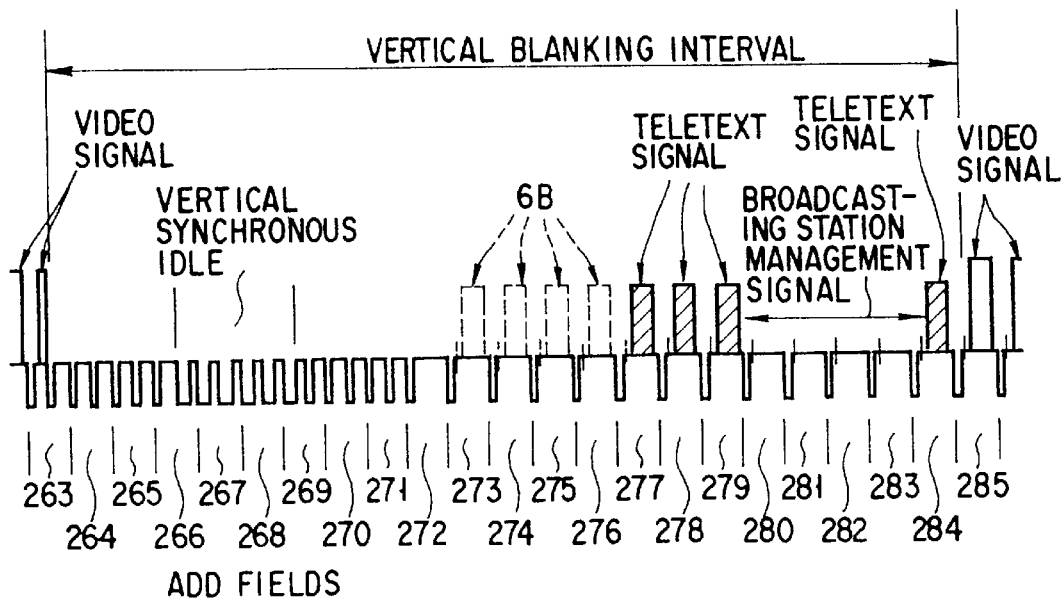
F I G. 6B

| CURRENT RANK | | | ABCD CLASSIC |
|---|---|---|---|
| ① Mr. AAA | -12 ⑮ | ⑤ Mr. FFF | -7 ⑮ |
| ② Mr. BBB | -9 ⑮ | ⑦ Mr. GGG | -6 Ⓕ |
| ③ Mr. CCC | -8 ⑮ | ⑧ Mr. HHH | -5 ⑯ |
| ③ Mr. DDD | -8 ⑯ | ⑧ Mr. III | -5 Ⓕ |
| ⑤ Mr. EEE | -7 ⑱ | ⑩ Mr. JJJ | -3 ⑰ |
BACK TO MENU ○    ○ NEXT PAGE
F I G. 9
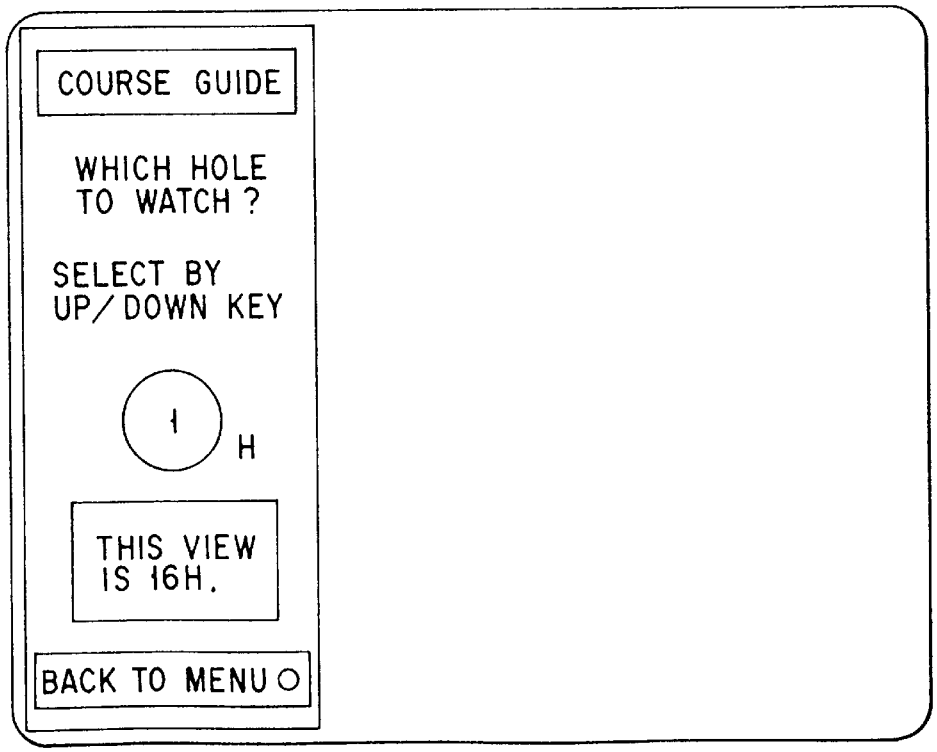
F I G. 10

| INDIVIDUAL SCORE | | | ABCD CLASSIC | | |
|---|---|---|---|---|---|
| 1 | Mr. AAA | -12 ⑮ | 5 | Mr. FFF | -7 ⑮ |
| 2 | Mr. BBB | -9 ⑮ | 7 | Mr. GGG | -6 Ⓕ |
| 3 | Mr. CCC | -8 ⑮ | 8 | Mr. HHH | -5 ⑯ |
| 3 | Mr. DDD | -8 ⑯ | 8 | Mr. III | -5 Ⓕ |
| 5 | Mr. EEE | -7 ⑱ | 10 | Mr. JJJ | -3 ⑰ |

BACK TO MENU ○   ○ NEXT PAGE

FIG. 13

| INDIVIDUAL SCORE | | | ABCD CLASSIC | | |
|---|---|---|---|---|---|
| 10 | Mr. KKK | -3 ⑰ | 14 | Mr. PPP | -2 Ⓕ |
| 10 | Mr. LLL | -3 Ⓕ | 14 | Mr. QQQ | -2 Ⓕ |
| 10 | Mr. MMM | -2 ⑱ | 18 | Mr. RRR | -2 Ⓕ |
| 14 | Mr. NNN | -2 Ⓕ | 18 | Mr. SSS | -2 Ⓕ |
| 14 | Mr. OOO | -2 Ⓕ | 18 | Mr. TTT | -2 Ⓕ |

BACK TO MENU ○   ○ NEXT PAGE

FIG. 14

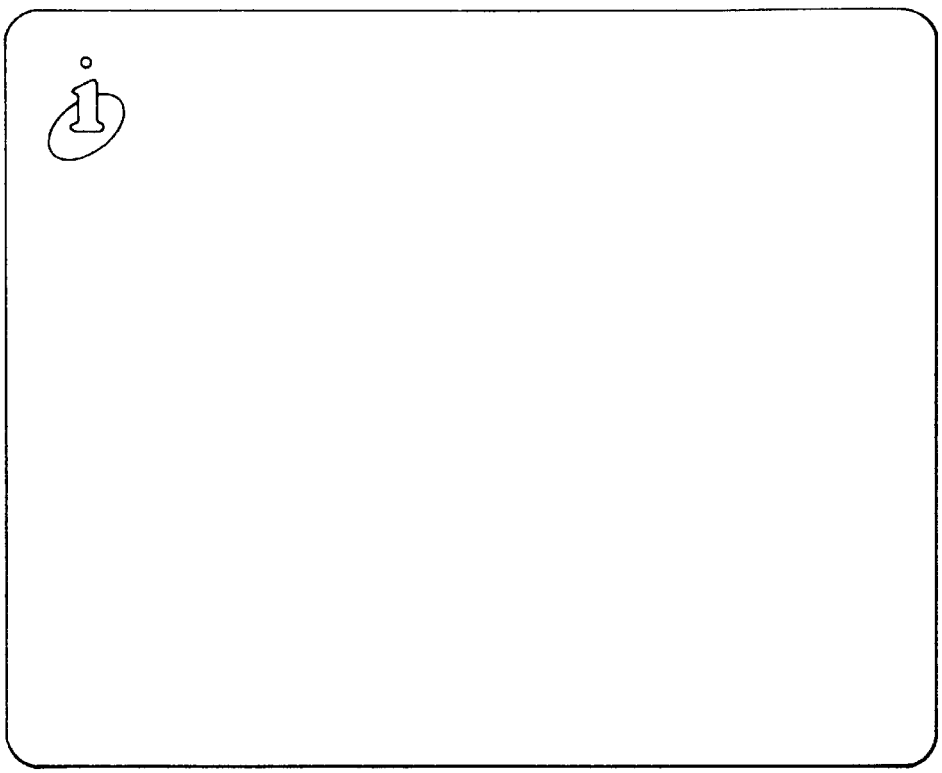
F I G. 16
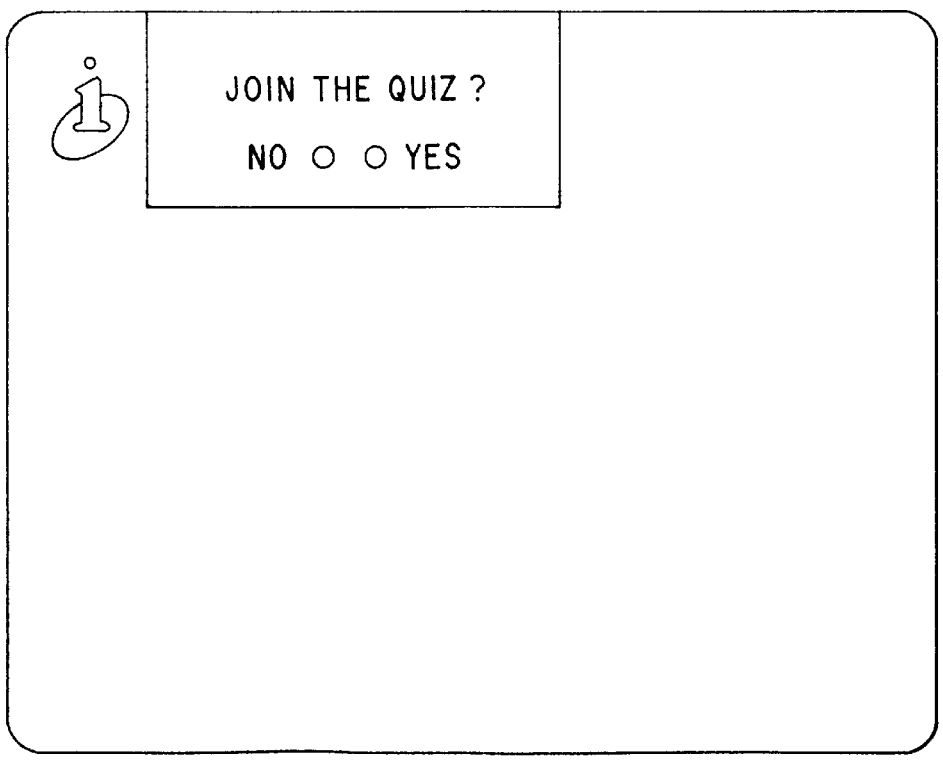
F I G. 17

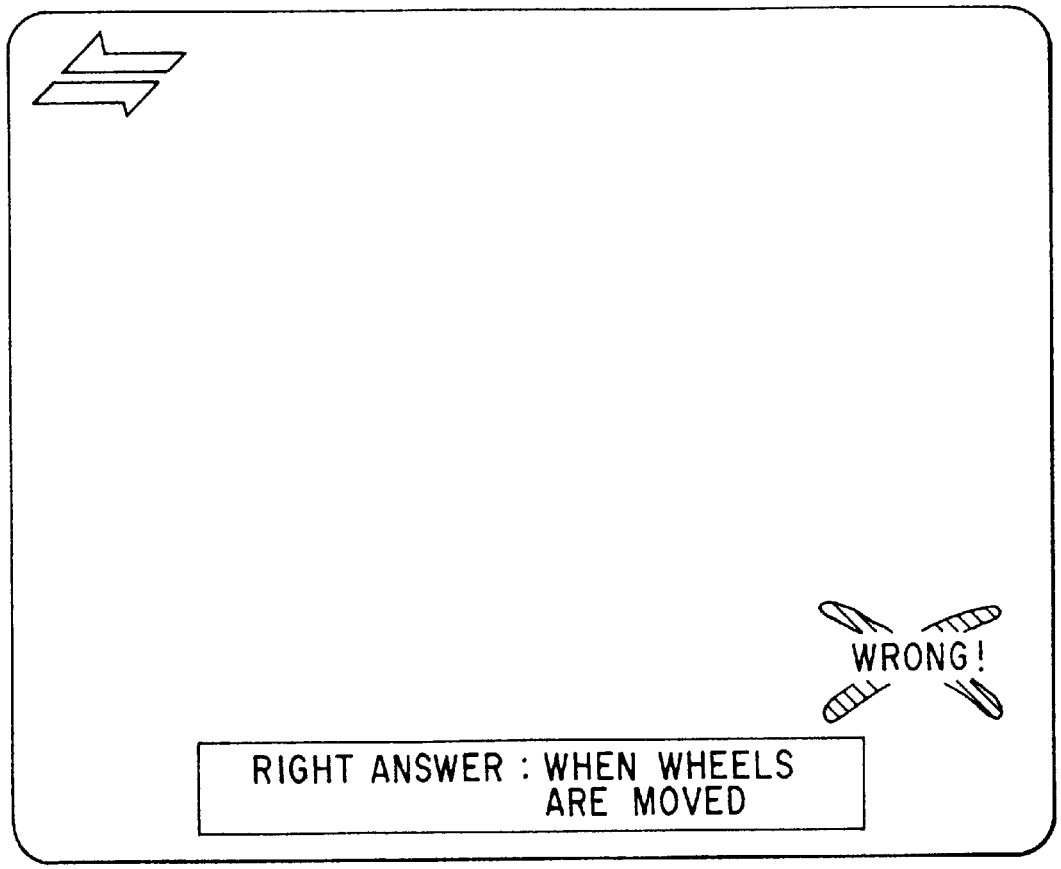
F I G. 22

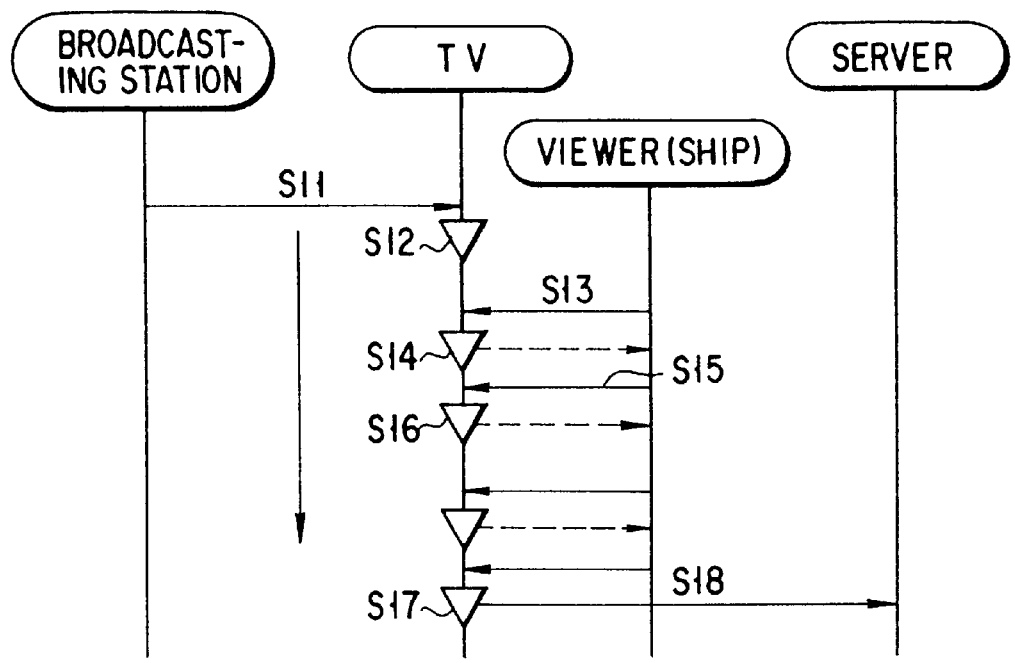
F I G. 24
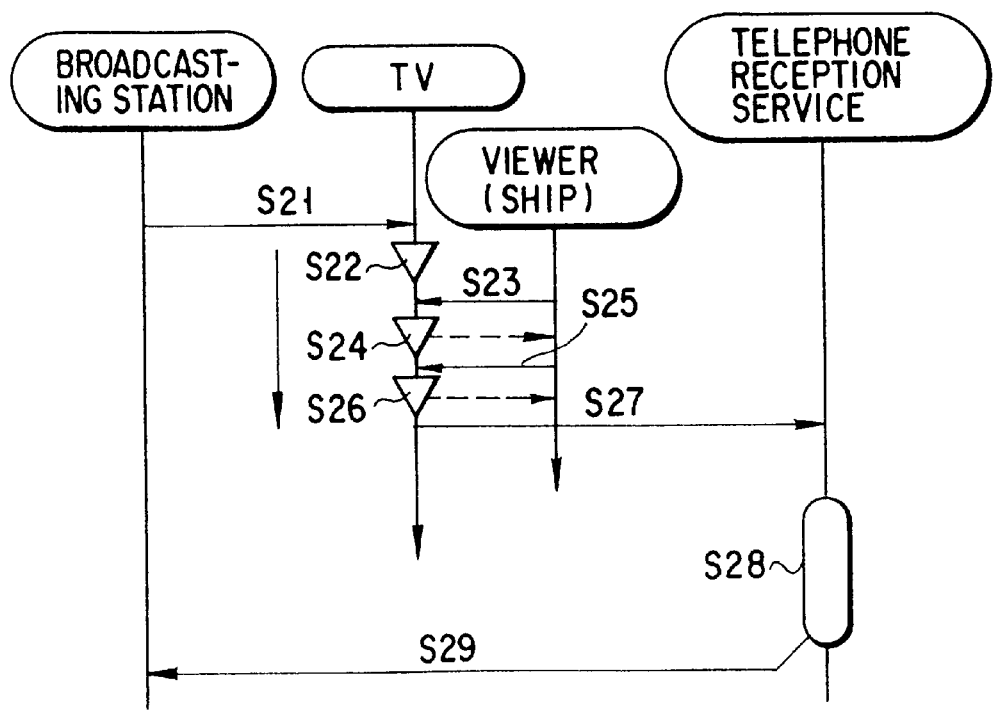
F I G. 26

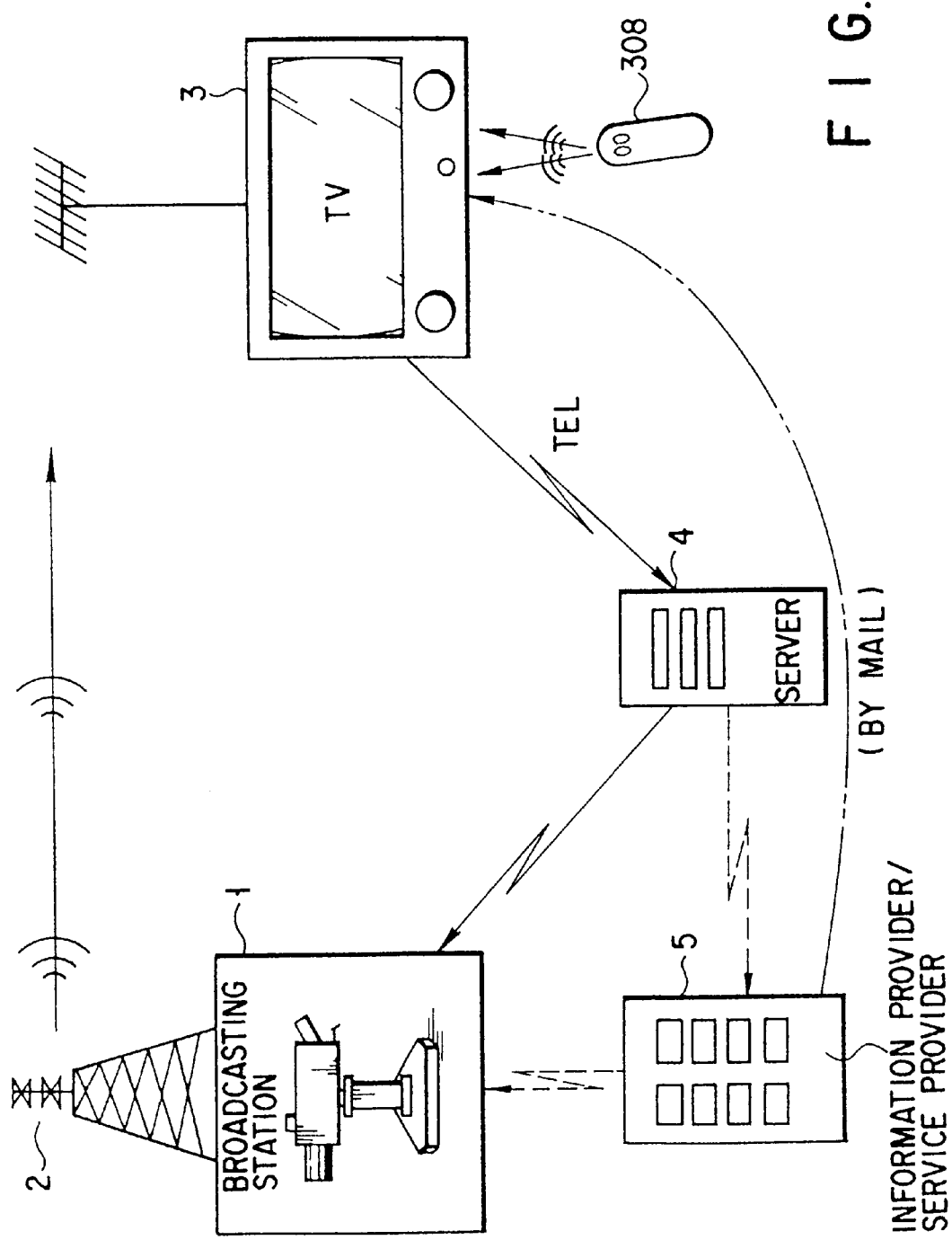
F I G. 28

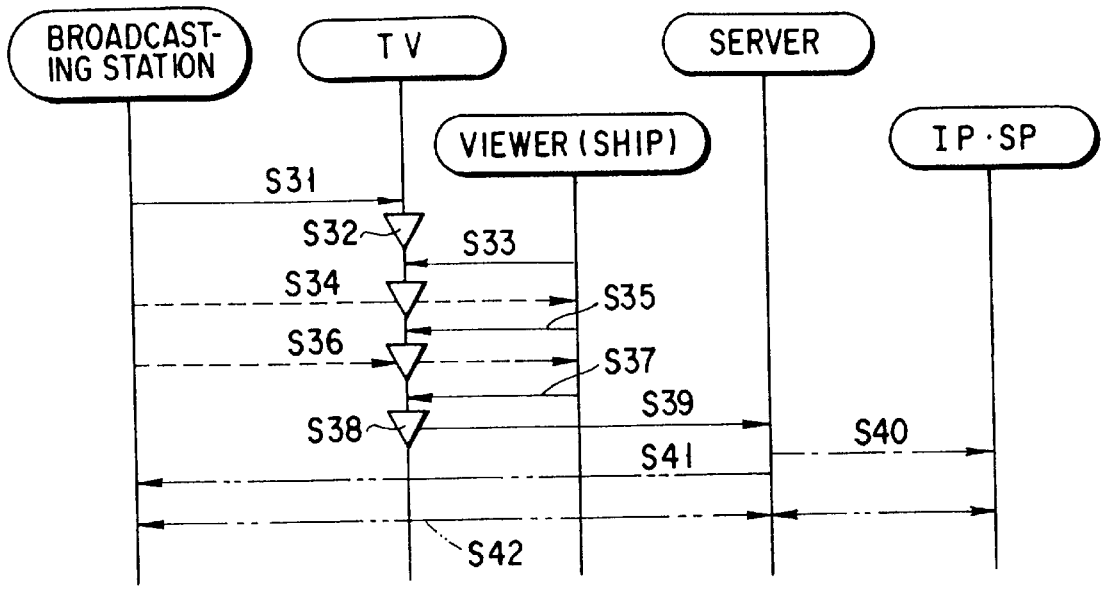
F I G. 29
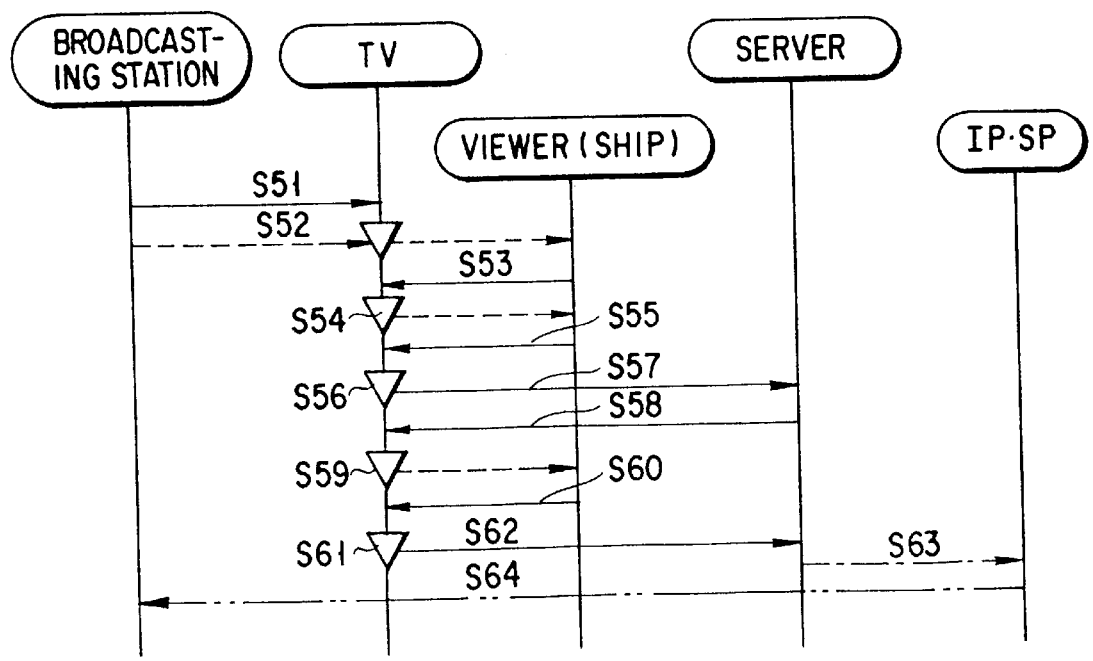
F I G. 31

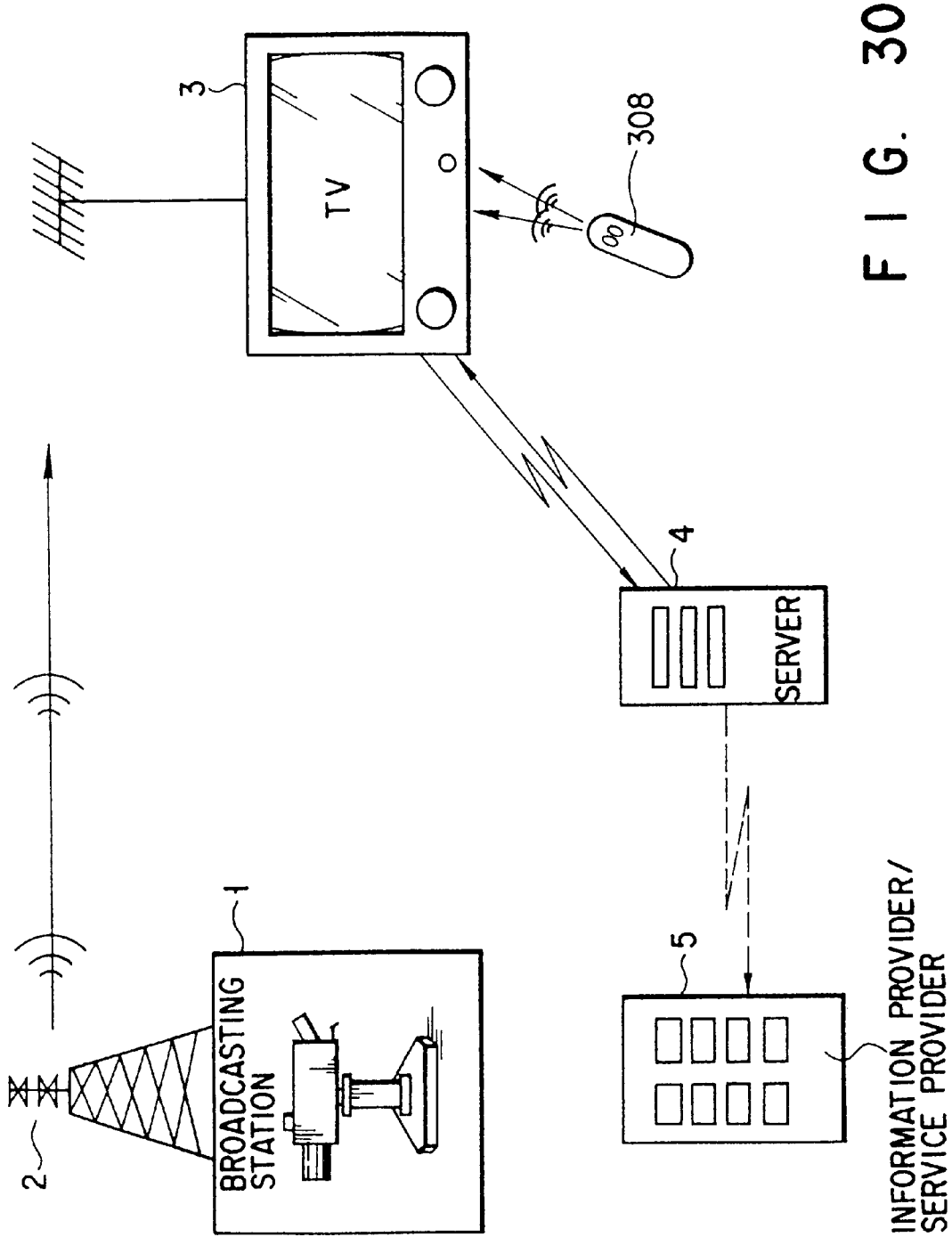
F I G. 30

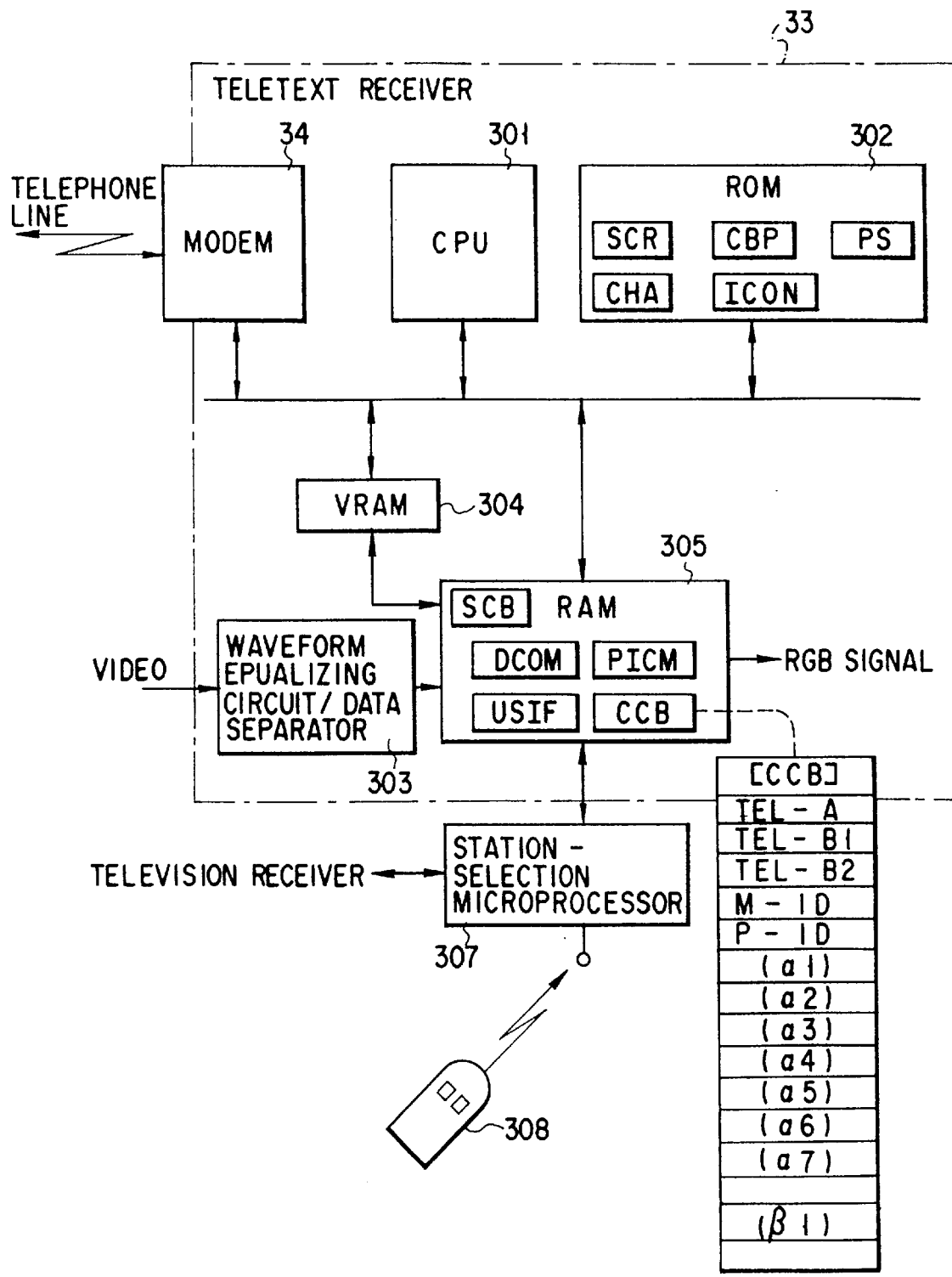
F I G. 32

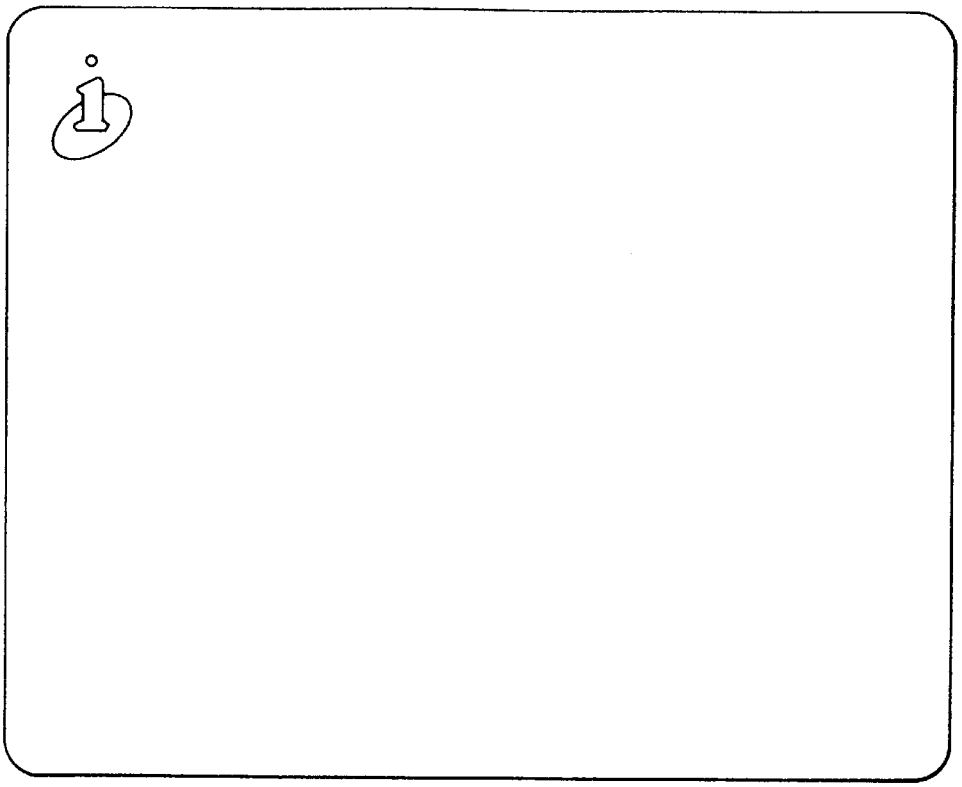
F I G. 33
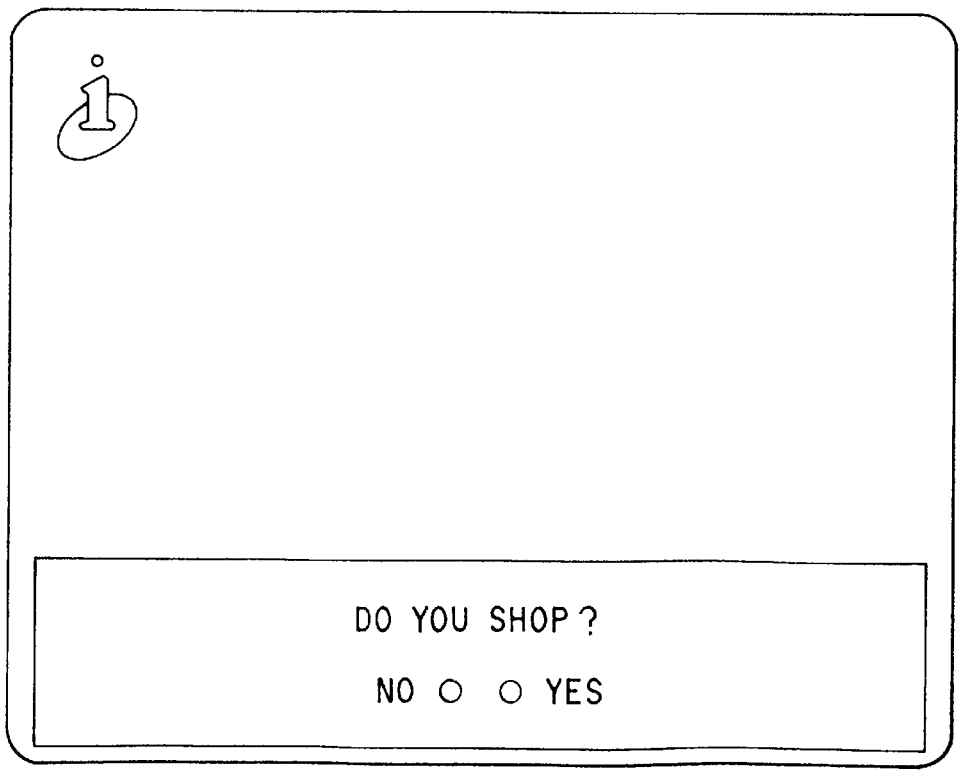
F I G. 34

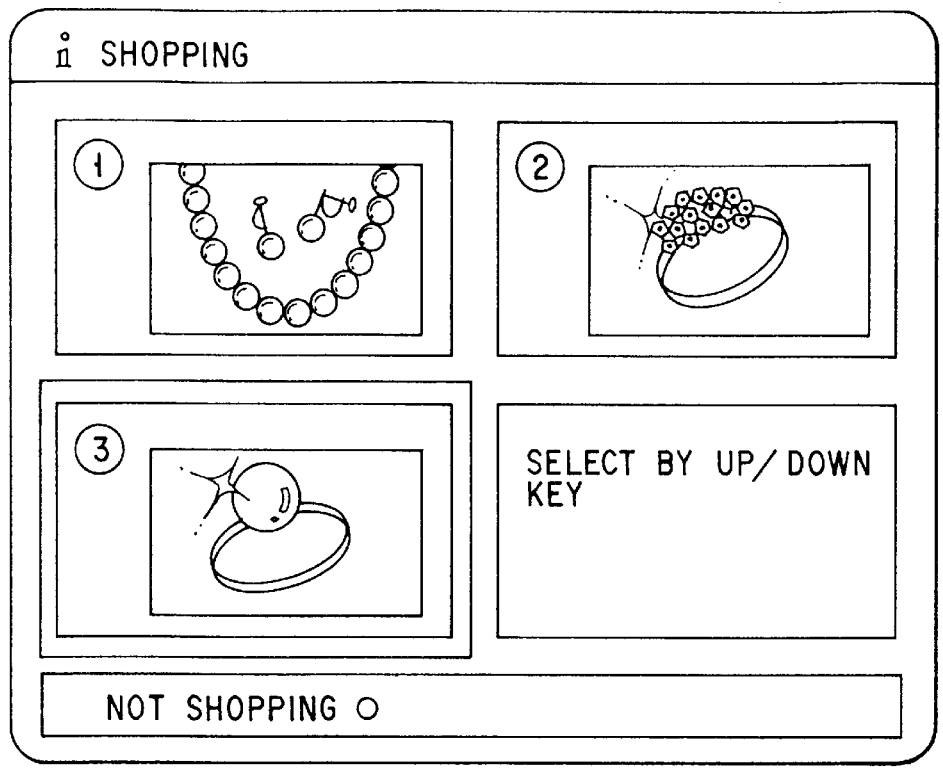
F I G. 35
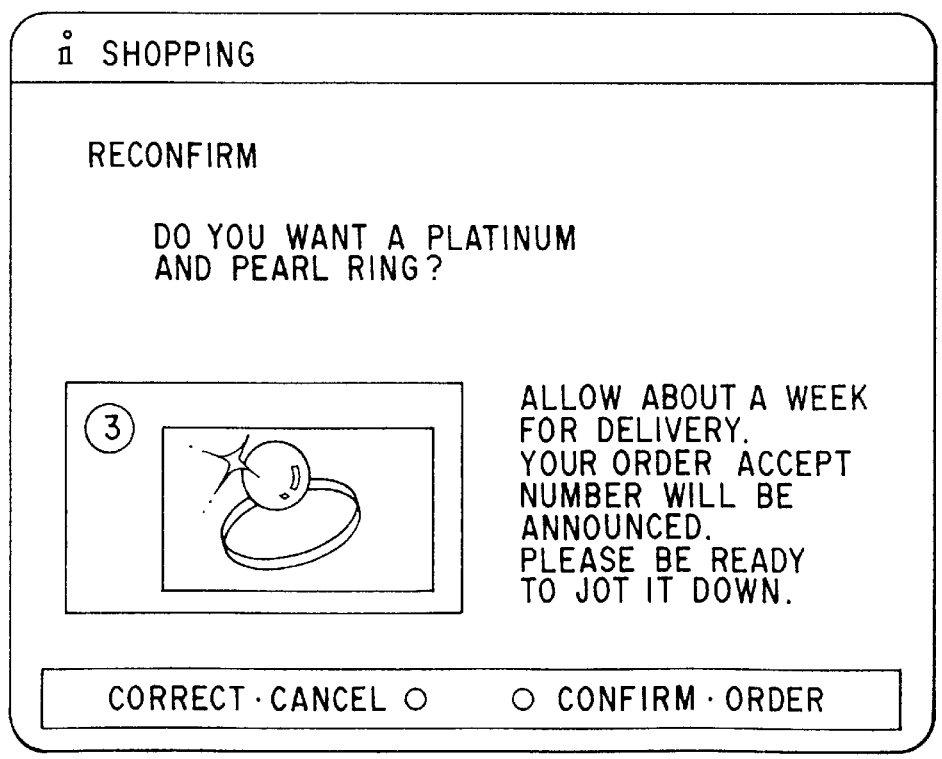
F I G. 36

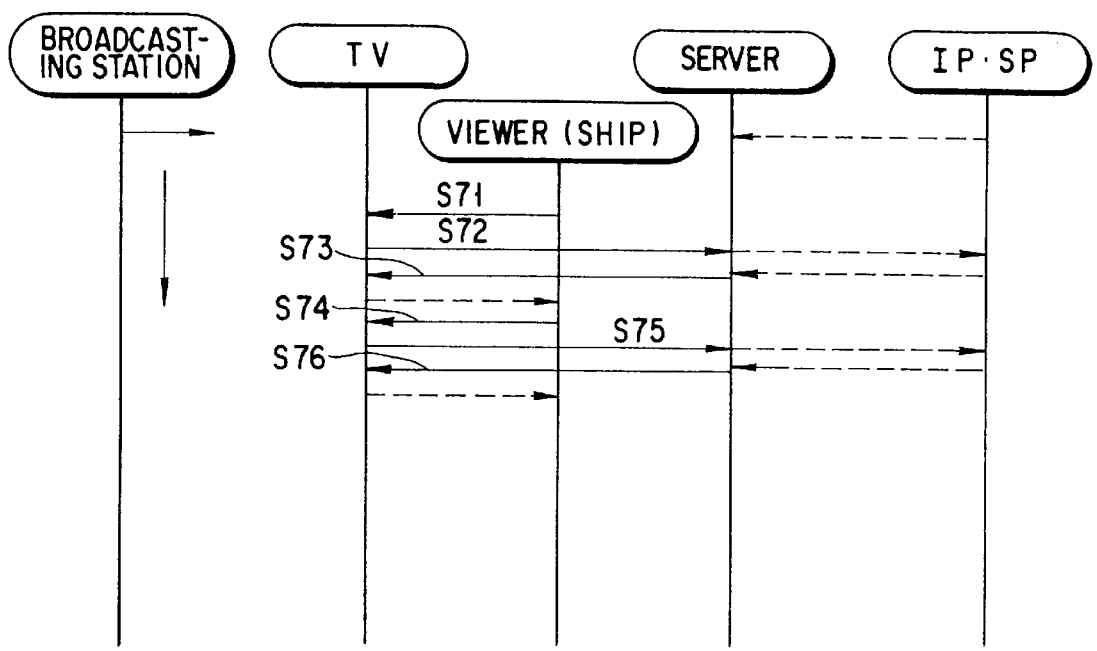
F I G. 40

INTERACTIVE TELEVISION SYSTEM WITH SCRIPT INTERPRETER

BACKGROUND OF THE INVENTION

1. Field of the Invention

The present invention relates to an interactive television system comprising a transmission device of television waves for teletext multiplex broadcasting, a household receiver having a teletext multiplex receiving function, and a circuit device connected to the receiver, and more particularly to an interactive television system for transmitting desired data in a vertical blanking interval. The invention also relates to an interactive television system of complementary information display type, virtual channel type, viewer participation type, response feedback type, broadcast relative online type, and broadcast independent online type.

2. Description of the Related Art

Recently, along with the trend of high function and high precision of general household television using ground waves, the technology for utilizing the general household television is noticed as part of multimedia. At the present, teletext multiplex broadcast is available, and, for example, cooking recipe guide and translation synchronized with the voice by character row display are presented as the information service relating to the program, or news, weather forecast, stock market report and others are presented as the information service not relating to the program.

This kind of television, at the present, offers one-way information transmission from the broadcasting station to the general household television, and the purpose of use is limited to a small range of application.

SUMMARY OF THE INVENTION

It is hence a first object of the invention to present an interactive television system comprising a transmission device of television waves for teletext multiplex broadcasting, a household receiver having a teletext multiplex receiving function, and a circuit device connected to the receiver, in which the consumer cost is kept to a minimum by effectively utilizing the existing infrastructure, and versatile and specific information linking with the program is timely. presented, and an interactive function between a television (household receiver) and a viewer is realized.

It is a second object of the invention to present an interactive television system for realizing an information exchange system for general household having the function of selection of information by the user, that is, the interactive function, which is one of the features of multimedia information, easily by effectively utilizing the existing infrastructure without demanding large consumer cost.

According to a first aspect of the invention, a television system comprises receiving means for receiving a video signal including control data, means for identifying the control data from the video signal received by the receiving means and for storing the identified control data, means for inputting an instruction from an operator, a display, first display means for displaying an additional information selection screen for selecting arbitrary additional information from plural pieces of additional information on the display, according to the stored control data, in response to the instruction input by the input means, and second display means for displaying a screen corresponding to additional information selected by the operator of the plural pieces of additional information on the display, according to the stored control data, in response to the instruction input by the input means.

This interactive television system makes effective use of the existing infrastructure for selection of information by the user, that is, the interactive function, which is one of the features of multimedia information. It hence presents an interactive television system of complementary information display type that is easily realized without demanding large extra cost to the broadcasting station and users.

Herein, as the existing infrastructure, the broadness in coverage and rapidity in reporting which are basic features of television broadcast, coding transmission system in vertical blanking interval (VBI) of television broadcast, and public telephone line are utilized effectively. In an economically advantageous system, still more, the interactive television system of complementary information display type capable of presenting specific information timely by linking with the program is realized.

According to a second aspect of the invention, a television system comprises a receiver, and line processing device, the receiver comprising: first receiving means for receiving a video signal including transfer destination information and control data, means for identifying the control data and the transfer destination information from the video signal received by the first receiving means and for storing the identified control data, means for inputting an instruction from an operator, a display, a memory for storing identification information, display means for displaying an additional information selection screen for selecting arbitrary additional information from plural pieces of additional information according to the stored control data, in response to the instruction input by the input means, and output means for outputting transfer data corresponding to additional information selected by the operator of the plural pieces of additional information, together with the identification information stored in the memory, according to the transfer destination information, in response to the instruction input by the input means, and the line processing device comprising: second receiving means for receiving the transfer data and the identification information output from the output means, and processing means for executing processing which corresponds to the additional information selected by the operator, according to the transfer data and identification information received by the second receiving means.

According to a third aspect of the invention, a television system comprises a plurality of receivers, and a line processing device connected to the plurality of receivers, each one of the plurality of receivers comprising: first receiving means for receiving a video signal including transfer destination information and control data, means for identifying the control data and the transfer destination information from the video signal received by the first receiving means and for storing the control data and the transfer destination information, means for inputting an instruction from an operator, a display, a memory for storing identification information, display means for displaying an additional information selection screen for selecting arbitrary additional information from plural pieces of additional information according to the stored control data, in response to the instruction input by the input means, and output means for outputting transfer data corresponding to the additional information selected by the operator, together with the identification information stored in the memory to the line processing device, according to the transfer destination information, in response to the instruction input by the input means, and the line processing device comprising: second receiving means for receiving the transfer data and the identification information outputted from the output means, and processing means for executing predetermined processing in every one of the plural pieces of additional information, according to the transfer data and the identification information received by the second receiving means.

According to a fourth aspect of the invention, a television system comprises a receiver, and line control device, the receiver comprising: first receiving means for receiving a video signal including transfer destination information and control data, means for identifying the control data and the transfer destination information from the video signal received by the first receiving means and for storing the control data and the transfer destination information, means for inputting an instruction from an operator, a display, a memory for storing identification information, display means for displaying an additional information selection screen for selecting arbitrary additional information from plural pieces of additional information according to the stored control data, in response to the instruction input by the input means, and first output means for outputting transfer data corresponding to additional information selected by the operator of the plural pieces of additional information, together with the identification information stored in the memory, according to the transfer destination information, in response to the instruction input by the input means, and the line control device comprising: second receiving means for receiving the transfer data and the identification information output from the first output means, a database dealing with at least one of the receiver and the operator, and second output means for outputting response data corresponding to the additional information selected by the operator of the plural pieces of additional information, according to the transfer data and the identification information received by the second receiving means, and the database.

According to a fifth aspect of the invention, a television system comprises a receiver, and a server, the receiver comprising: first receiving means for receiving a video signal including telephone number information and control data, means for identifying the control data and the telephone number information from the video signal received in the first receiving means and storing the control data and the telephone number information, means for inputting an instruction from an operator, a display, a memory for storing identification information, first display means for displaying an additional information selection screen for selecting arbitrary additional information from plural pieces of additional information according to the stored control data, in response to the instruction input by the input means, output means for outputting transfer data corresponding to additional information selected by the operator of the plural pieces of additional information, together with the identification information stored in the memory onto a telephone line, according to the telephone number information, in response to the instruction input by the input means, and second display means for receiving the response data output on the telephone line, and displaying the information corresponding to the received response data on the display; and the server comprising: second receiving means for receiving the transfer data and the identification information output from the output means through the telephone line, a database dealing with at least one of the receiver and the operator, and means for retrieving the database according to the identification information received by the second receiving means, and outputting response data corresponding to the transfer data onto the telephone line.

According to a sixth aspect of the invention, a television system comprises a receiver, and a server, the receiver comprising: input means for inputting an instruction from an operator, a display, a first memory for storing identification information, a second memory for storing telephone number information of a the server, output means for outputting transfer data corresponding to the instruction input by the input means, together with the identification information stored in the first memory, onto a telephone line, according to the telephone number information, in response to the instruction input by the input means, and display means for receiving response data output onto the telephone line, and displaying information corresponding to the received response data on the display, and the server comprising: receiving means for receiving the transfer data and the identification information output from the output means through the telephone line, a database dealing with at least one of the receiver and the operator, and means for retrieving the database according to the identification information received in the second receiving means, and outputting response data corresponding to the transfer data onto the telephone line.

The interactive television system according to the second to sixth aspects easily realizes an information exchange system for general household having the function of selection of information by the user, that is, the interactive function, which is one of the features of multimedia information, by effectively utilizing the existing infrastructure without demanding large consumer cost. Herein, as the existing infrastructure, the broadness in coverage and rapidity in reporting which are basic features of television broadcast, coding transmission system in vertical blanking interval (VBI) of television broadcast, and public telephone line are utilized effectively, and in an economically advantageous system configuration, the interactive television system of virtual channel type, viewer participation type, response feedback type, and online service type for general household is realized.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 2 is a flowchart of operation interlocked with the on-screen program in the first embodiment;

FIG. 5 is a diagram showing a button constitution example of television remote control in the first embodiment;

FIGS. 6A and 6B are diagrams showing transmission timing of control data (script and screen control information) in the first embodiment;

FIG. 9 is a diagram showing an example of screen display in the first embodiment;

FIG. 10 is a diagram showing an example of screen display in the first embodiment;

FIG. 13 is a diagram showing an example of screen display in the first embodiment;

FIG. 14 is a diagram showing an example of screen display in the first embodiment;

FIG. 16 is a diagram showing an example of screen display in the first embodiment;

FIG. 17 is a diagram showing an example of screen display in the first embodiment;

FIG. 22 is a diagram showing an example of screen display in the first embodiment;

FIG. 24 is a flowchart showing operation not interlocked with the on-screen program in the second embodiment;

FIG. 26 is a flowchart showing operation interlocked with the on-screen program in the third embodiment;

FIG. 28 is a block diagram showing a constitution of an interactive television system of response feedback type according to a fourth embodiment of the invention;

FIG. 29 is a flowchart showing operation interlocked with the on-screen program in the fourth embodiment;

FIG. 30 is a block diagram showing a constitution of an interactive television system of online service type according to a fifth embodiment of the invention;

FIG. 31 is a flowchart showing operation interlocked or not interlocked with the on-screen program in the fifth embodiment;

FIG. 32 is a block diagram showing an internal structure of a multimedia teletext broadcast receiving circuit 33 in the fifth embodiment;

FIG. 33 is a diagram showing an example of screen display in the second embodiment;

FIG. 34 is a diagram showing an example of screen display in the second embodiment;

FIG. 35 is a diagram showing an example of screen display in the second embodiment;

FIG. 36 is a diagram showing an example of screen display in the second embodiment;

FIG. 40 is a flowchart showing operation independent of broadcast in the sixth embodiment.

DETAILED DESCRIPTION OF THE PREFERRED EMBODIMENTS

Figure 1:
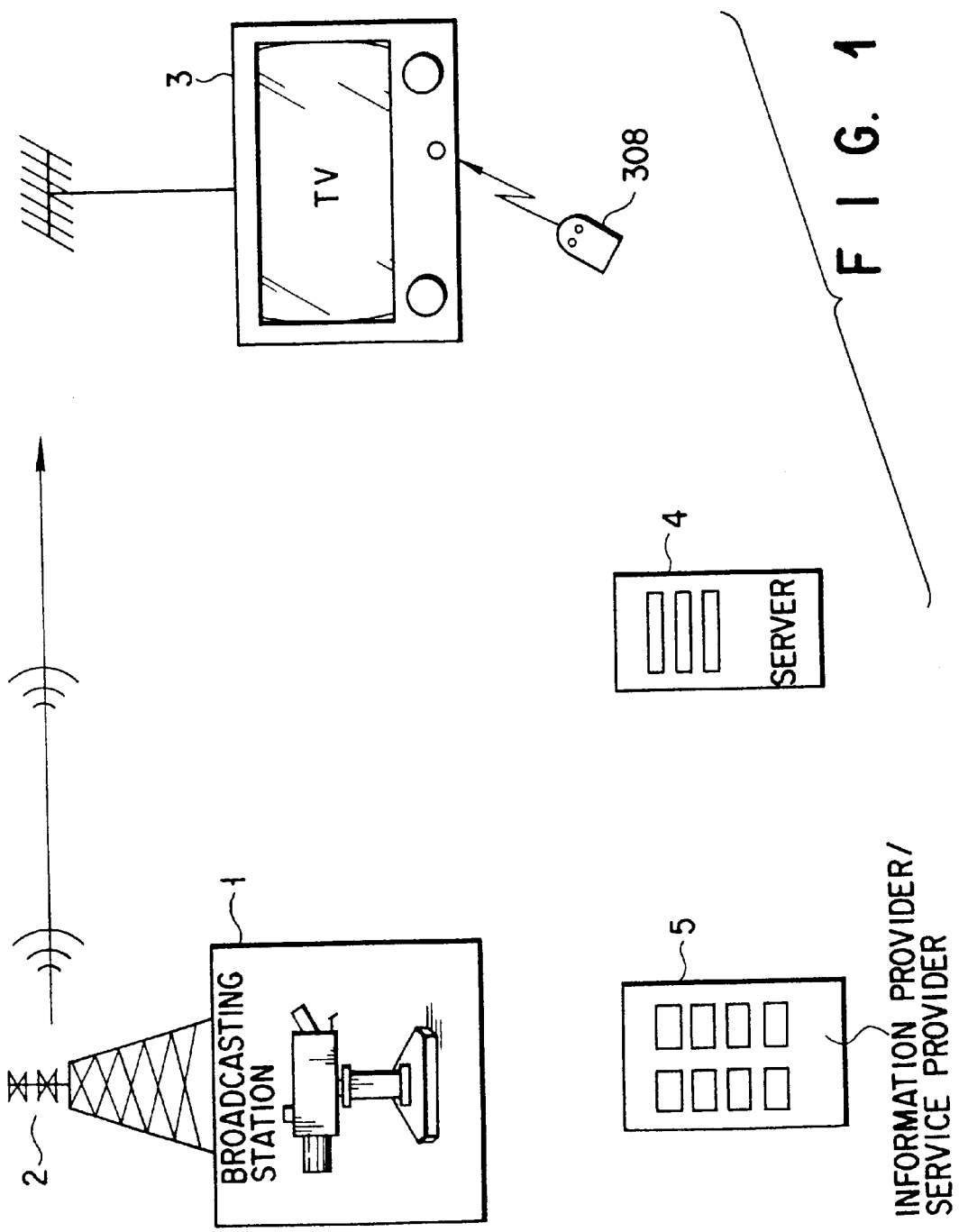
FIG. 1 is a block diagram showing a constitution of an interactive television system of complementary information display type according to a first embodiment of the invention.

Referring now to the drawings, first to sixth embodiments of the invention are described in detail below.

First, a first embodiment of the invention is described by reference to FIGS. 1 to 22.

FIG. 1 is a diagram showing a system configuration for explaining the outline of the first embodiment.

The invention is an interactive television system of complementary information display type realizing an interaction function between a television and a viewer. From a transmission antenna 2 of a broadcasting station 1, control data including scrip and screen control information for presenting subsidiary image information relating to main broadcast is transmitted in a vertical blanking interval (VBI) of main broadcasting program.

Herein, the entire bit stream for display of additional information transmitted in the teletext multiplex transmission period in VBI is called merely "script" except for partial control information, and therefore the script include the header, form, resource, and program (script main body). The same definition of the term script is applied to other embodiments described later.

A household interactive television receiver (TV) 3 receives the television wave transmitted from the broadcasting station 1, and accepts program presentation of desired channel by button operation of a remote controller (television remote controller) 308.

At this time, the interactive television receiver (TV) 3, when receiving the broadcasting program by teletext (coded transmission type teletext), receives and buffers the teletext signal in the teletext receiving circuit.

When a teletext program is selected by button operation of the television remote controller 308, the teletext program according to the selection instruction is decoded by teletext decoder, and is displayed in a specified display format.

In this invention, by the reception script by the received teletext signal, the existing teletext program is further developed, and it is intended to present various specific additional information widely linking with the on-screen program timely, on the basis of the reception script for display of additional information, according to the instruction of the viewer.

For example, referring to a sports program as additional information that can be displayed by the reception script, as the additional information for a gold live program, the rank, individual score, course layout and others relating to the live program (on-screen program) are prepared, and as the viewer manipulates the television remote controller 308 to request to display selected screen of additional information, the desired additional information can be selected on the additional information selection screen according to the request, so that the selected rank, individual score, or course layout relating to the on-screen program is presented to the viewer.

FIG. 2 is a diagram showing outline of processing procedure of the portion relating to the invention, in this interactive television system of complementary information display type.

In FIG. 2, step S1 shows transmission process of television wave for teletext (coded transmission type teletext), and herein sowing the process of transmission of script (herein, the script is meant to include the header, form and resource, as well as the script main body (program) describing the process procedure) for presenting plural types of additional information relating to the main broadcast in the vertical blanking interval (VBI) included in the video signal of the main broadcast.

Step S2 shows the process of receiving the television wave in the interactive television receiver (TV) 3, and storing (buffering) the reception script.

Step S3 shows the process of sending out a display output request signal of additional information by manipulating the television remote controller 308.

Step S4 shows the process of executing the script according to the display output request of additional information from the viewer, creating additional information selection screen for selecting desired additional information from plural types of additional information, and displaying in part of the display screen.

Step S5 shows the process of manipulation of the television remote controller 308 by the viewer for sending out the additional information selection instruction signal.

Step S6 shows the process of displaying the screen of the selected and instructed additional information according to the additional information selection instruction from the viewer.

By this interactive function using the television as the medium, for example, linking with various onscreen programs such as live sports and news, versatile and specific additional information can be presented timely. For example, in a live golf program, as the additional information for a gold live program, the rank, individual score, course layout and others relating to the live program (on-screen program) are prepared, and as the viewer manipulates the television remote controller 308 to request to display selected screen of additional information, the desired additional information can be selected on the additional information selection screen according to the request, so that the selected rank, individual score, or course layout relating to the on-screen program is presented to the viewer.

Alternatively, as additional information, for example, in a children's educational program, simple selectors may be provided, the script showing the screen of right answer to a quiz by selection of viewer is prepared and transmitted from the transmission antenna 2 of the broadcasting station 1, and in the children's educational program, according to the selection manipulation of selectors by the television remote controller operation by the viewer, the answer is judged according to the received right answer information, and the result of judgment may be displayed on the screen.

Figure 3:
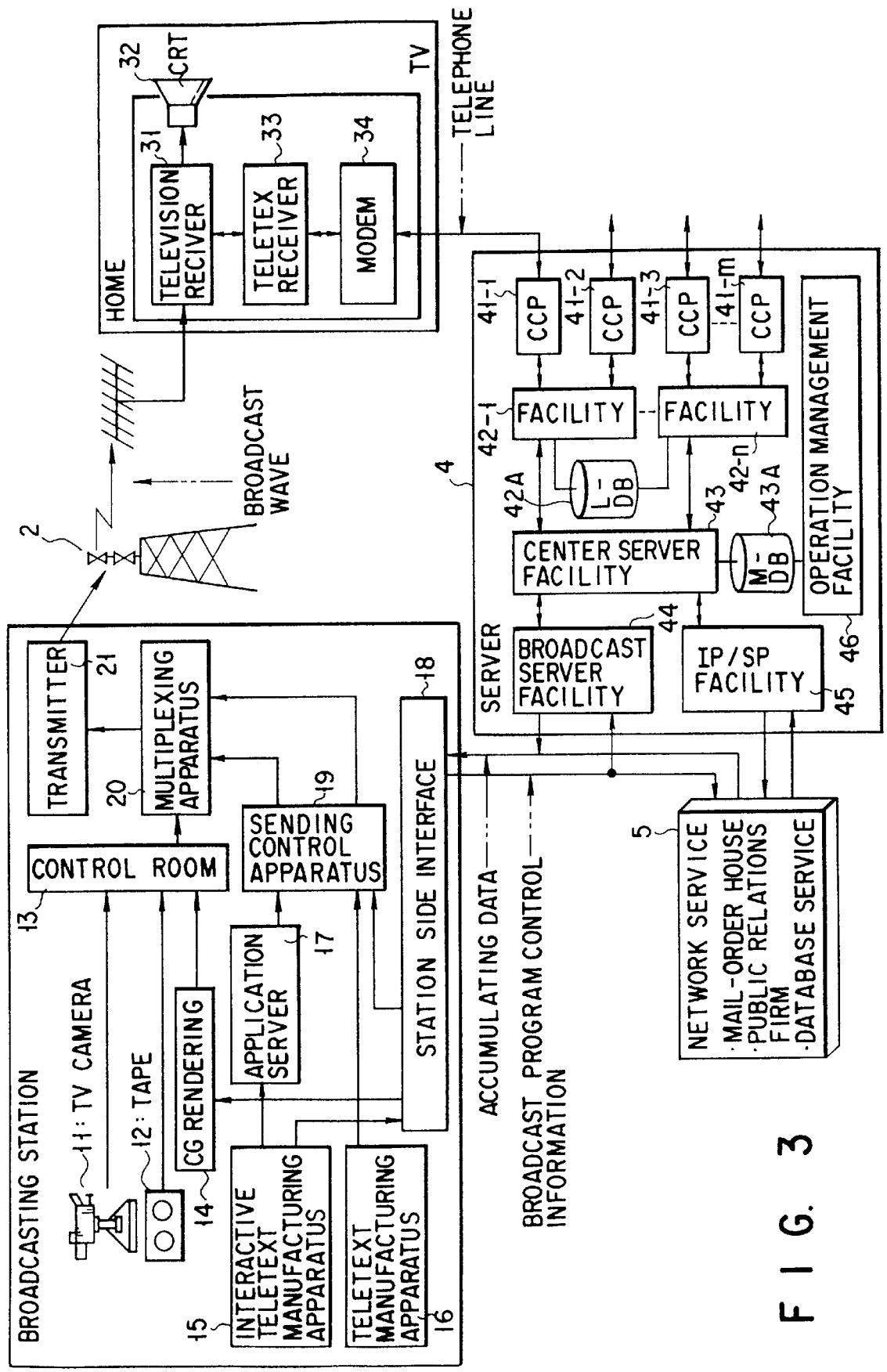
FIG. 3 is a block diagram showing the constitution of parts shown in FIG. 1 in the first embodiment.

FIG. 3 is a block diagram showing the constitution of parts in the interactive television system of complementary information display type in the embodiment of the invention, and same parts as in FIG. 1 are identified with same reference numerals and their explanations are omitted.

Reference numerals 11 to 21 show constituent elements in the broadcasting station 1. A television camera 11 is installed in the studio for producing a program. A video tape recorder 12 records the picture and sound for program production in a video tape, and reproduces. A control room 13 is used for various adjustments for program production. A CG rendering 14 is for computer graphic processing for program production.

An interactive teletext manufacturing apparatus 15 creates script data for presenting plural types of additional information relating to main broadcast in the VBI included in the video signal of main broadcast (on-screen program). This script includes an individual program ID for every bidirectional program (type of additional information).

A teletext manufacturing apparatus 16 creates transmission data for existing teletext, for example, weather forecast and stock market quotation.

An interface 17 is an application server for transferring the script created in the interactive teletext manufacturing apparatus 15 to the transmission apparatus of the television wave, and reference numeral 18 is for connection control with an external line. A sending control apparatus 19 is responsible for control of teletext (VBI data transmission) including the script relating to the invention. A multiplexing apparatus 20 superposes teletext (VBI data) on the main broadcast (on-screen program). A transmitter 21 sends out the multiplexed television wave (television wave for teletext) from the transmission antenna 2.

Reference numerals 31 to 34 show constituent elements of the interactive television receiver (TV) 3. A teletext receiver 31 receives teletext transmitted from the transmission antenna 2. A display unit (cathode-ray tube: CRT) 32 selectively displays the ordinary teletext obtained in a multimedia teletext receiver 33 or interactive teletext of the invention, in addition to the main broadcast (on-screen program) obtained in the teletext receiver 31.

The multimedia teletext receiver 33 discriminates and takes in the teletext data (VBI data) from the received broadcast wave, and classifies into the data of ordinary teletext, and data of interactive teletext (herein data of plural types of additional information relating to the main broadcast), and generates display data of ordinary teletext and display data of plural types of additional information relating to the main broadcast. Herein, however, the display control function of ordinary teletext is omitted, and only the display control function of plural types of additional information relating to the main broadcast (interactive teletext decoder) is described. In the interactive teletext decoder of the multimedia teletext receiver 33, the reception script is interpreted and executed, and display information is supplied into the video processing circuit of the teletext receiver 31, and the information to be sent out to the line is supplied into a modem 34, and the detail is described later by referring to FIG. 4.

The modem 34 is used for connecting the multimedia teletext receiver 33 to the public telephone line, and hence, through the modem 34, the data handled in the multimedia teletext receiver 33 can be transmitted by dialing automatically to the line connection destination (for example, server) given from the interactive teletext decoder of the receiver 33 (built in the reception script). That is, by specific key input operation of the television remote controller 308, the information registered in the registration setting unit [PS] of ROM device control and individual identification information mentioned later may be automatically dialed, through the modem 34, to the line connection destination (for example, server 4) given from the interactive teletext decoder (built in the reception script) as the transmission source.

Reference numerals 41 to 46 show constituent elements of the server 4. A communication control processor (CCP) facility 41 (41-1, 41-2, 41-3, . . . 41-m) possesses the multimedia teletext receiver 33. Dealing with the interactive television receivers (TV) 3 at multiple homes, data is transmitted and received with the multimedia teletext receiver 33 in each TV 3.

Plural response server facilities 42 (42-1, 42-n) are provided under the control of a center server facility 43 mentioned later, and transmission and reception information is distributed and processed with multiple TV receivers 3. The response server facility 42 is connected to local database (L-DB) 42A accumulating the individual information of specific area for subscriber control.

The center server facility 43 accumulates and processes the disperse processing results of the response server facilities. The center sever facility 43 is connected to the master database (M-DB) 43A accumulating the individual information in the whole area for subscriber control.

A broadcast server facility 44 receives process instructions to response from the interactive TV 3 preliminarily from the broadcasting station 1, or sends back the response result of the interactive TV 3 to the broadcasting station 1 in a format requested by the broadcasting station. 1.

An IP/SP (information provider/service provider) server facility 45 receives process instructions to the response from the interactive TV 3 preliminarily from network service 5, or sends back the response result of the interactive TV 3 to the network service 5 in a format requested by the network service 5.

An operation management facility 45 manages the operation of the server system comprising the above facilities.

Figure 4:
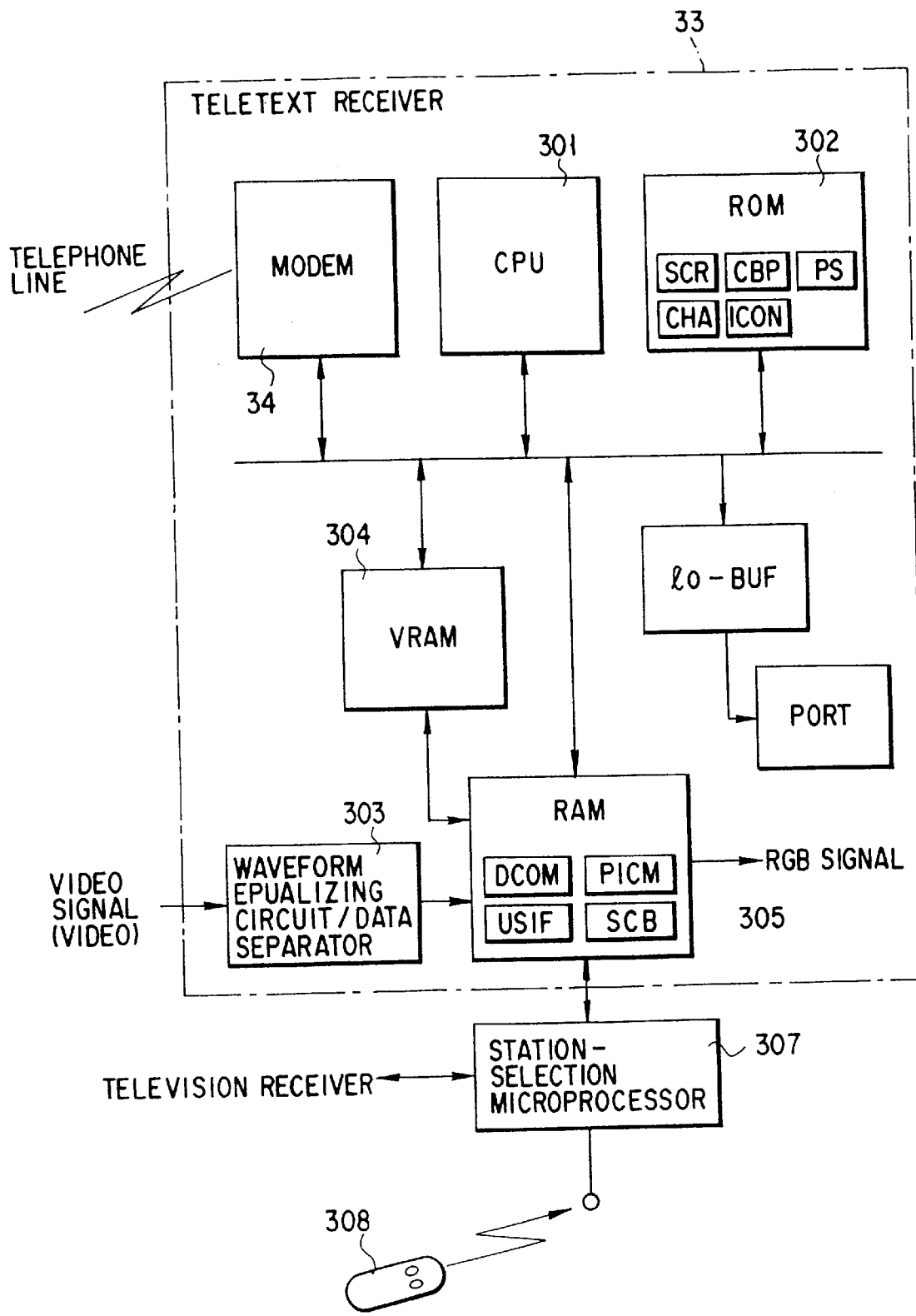
FIG. 4 is a block diagram showing an internal structure of a multimedia teletext broadcast receiving circuit 33 shown in FIG. 3.

FIG. 4 is a functional block diagram showing an internal structure of the multimedia teletext receiver 33.

In FIG. 4, a CPU (central processing unit) 301 is responsible for control of the multimedia teletext receiver 33. In this embodiment, the CPU 301 processes the script for presenting plural types of additional information relating to the main broadcast, and as this CPU 301 executes the process of the script process module [SCR] in the ROM 302 mentioned later, an interactive teletext decoder is realized. Herein, the reception script distinguished from the video signal is buffered (stored) in the RAM 305, and is interpreted and executed, and display data (RGB signal) is generated.

A control memory (read-only memory: ROM) 302 stores the basic control program executed by the CPU 301 and fixed information, and it is accessed by the CPU 301 to be read. Herein, the script process module [SCR] for executing script process, teletext process module [CBP] for executing teletext, and others are stored, and there are also registration setting unit [PS] of machine control and individual identification information in which machine individual ID designated in each receiver and individual ID are registered, kanji and character control unit [CHA] in which kanji and characters are stored and controlled, and icon control unit [ICON], among others.

A data separation processing circuit (waveform equalizing data separating circuit) 303 discriminates teletext data and interactive teletext data (that is, script for display of additional information) from the video signal received in the teletext receiver 31. The discriminated reception teletext data and reception script are stored in a RAM 305 under the control of the CPU 301.

A display memory (VRAM: video random access memory) 304 is a memory for storing display data, in which, for example, display data processed by a picture process program [PICM] is stored.

The memory (RAM) 305 is used as work memory of the CPU 301, and herein the data communication control program [DCOM], picture process program [PICM], user interface program [USIF], script buffer [SCB], and teletext data buffer are provided.

A station selection microprocessor (MP) 307 receives a signal from the television remote controller 308, separates into television manipulation command, and selection control command for display of additional information, sends out the television manipulation command such as channel designation to the television receiver, and stores the selection control command for display of additional information temporarily in the buffer register for remote control reception, and sends to the CPU 301 in bit parallel.

The television remote controller 308 remote controls the interactive television receiver 3. Herein, as shown in FIG. 5, there are mode selection key (i key) for changing the interactive mode between valid and invalid, direction command keys (up key, down key, left key, right key) for selecting a desired selector from plural selectors provided on the additional information selection screen, and determination (firm) key.

Figure 7:
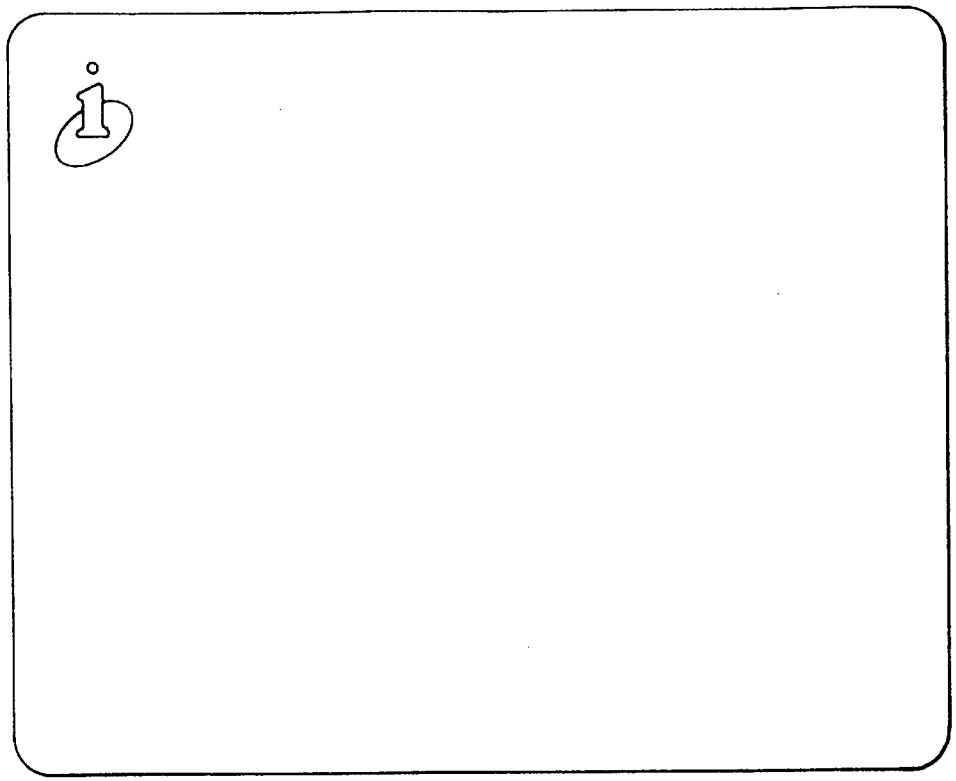
FIG. 7 is a diagram showing an example of screen display in the first embodiment.

The mode selection key (i key) is a toggle switch for changing over the interactive mode valid and invalid alternately, and when the interactive mode is valid, as shown in FIG. 7, an "i" mark appears in the upper left corner of the display (CRT) 32.

The station selection MP 307 is usable only when the interactive mode is valid (that is, when the "i" mark is shown), and some of the keys (for example, numeric keys) are reflected only in the displayed additional information.

Incidentally, valid/invalid setting of the interactive mode is selected by force also at a certain timing according to the command built in the script in a specified additional information display, aside from manipulation of the television remote controller 308.

FIGS. 6A and 6B are transmission timing diagrams of control data including the script and screen control information, and herein, in addition to the horizontal scanning period (existing teletext signal) in the VBI for transmitting ordinary teletext data, the control data is transmitted by utilizing the horizontal scanning period in the VBI indicated by 6A and 6B. FIG. 6A shows even fields, and FIG. 6B shows odd fields.

FIGS. 7 to 22 show examples of screen transition state in the first embodiment. Specifically, FIGS. 7 to 15 show screen changes of a live golf game as an example of sports program. FIGS. 16 to 22 show screen changes in a quiz program. In the quiz program, the processing device for executing the script, that is, the CPU 301 judges the reply entered from the television remote controller 301 on the basis of the right answer information built in the script (for example, yes/no, selector number, quiz answer by symbol input), and displays the information of the result of judgment on the display screen at the display timing conforming to the screen control information received together with the script.

Examples of operation in this embodiment of the invention are described below.

From the transmission antenna 2 of the broadcasting station 1, the television wave for teletext (coded transmission type teletext) including control data in VBI (script and image control information) is transmitted in the transmission format shown in FIGS. 6A and 6B (step S1 in FIG. 2).

Herein, the script for presenting plural types of additional information relating to the main broadcast in the vertical blanking interval (VBI) included in the video signal of the main broadcast (including the script main body (program) describing the processing procedure, header, form, and resource) is transmitted. For example, in this explanation, a live golf game is transmitted together with plural types of additional information.

The interactive television receiver (TV) 3 receives the television wave (broadcast wave) of the live golf game, and the reception script included in the broadcast is stored (buffered). That is, the multimedia teletext receiver 33 provided in the interactive television receiver (TV) 3 discriminates and takes in the VBI data from the received broadcast wave, and separates into the data of ordinary teletext program and data of interactive teletext program (herein, the data of plural types of additional information relating to main broadcast), and generates display data of ordinary teletext program and display data of plural types of additional information relating to the main broadcast, and stores (buffers) them in the RAM 305 (step S2 in FIG. 2).

Herein, when the viewer manipulates the mode selection key (i key) of the television remote controller 308 and makes the interactive mode valid, the "i" mark appears in the upper left corner of the display unit (CRT) 32, telling that the interactive mode is valid (step S3 in FIG. 2).

Figure 8:
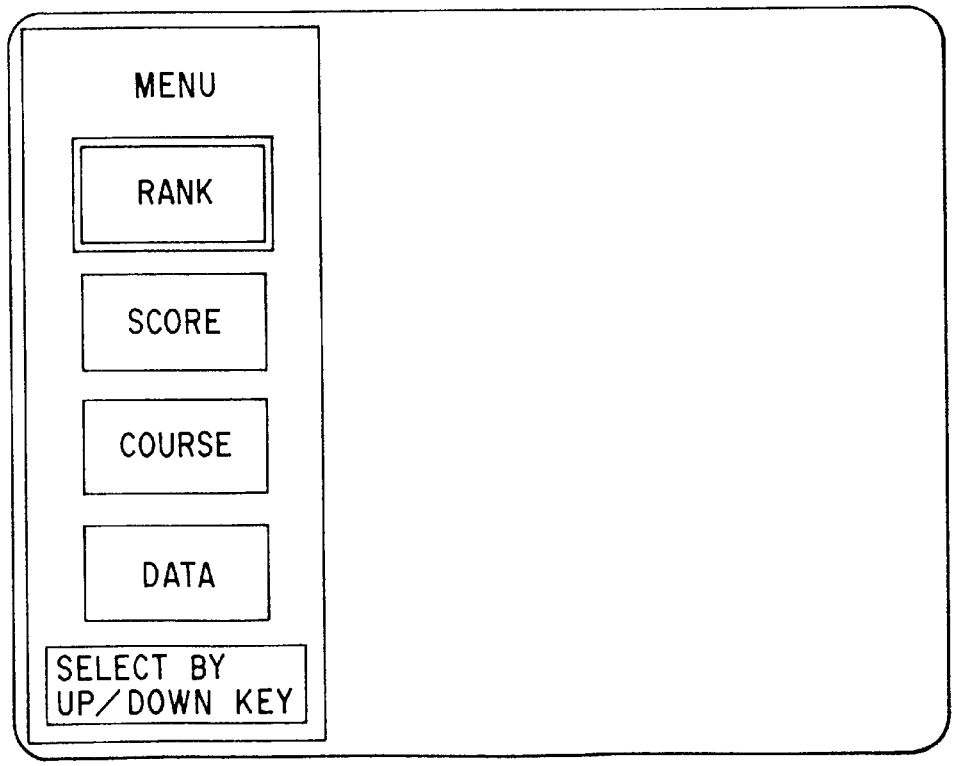
FIG. 8 is a diagram showing an example of screen display in the first embodiment.

Furthermore, along with the manipulation of the mode selection key (i key), by the execution of the script process by the interactive teletext decoder realized by execution of the process of script process module [SCR] in the ROM 302 by the CPU 301, for example, an additional information selection screen as shown in FIG. 8 is displayed (step S4 in FIG. 2).

On this additional information selection screen, as the viewer manipulates the direction command key (herein up key or down key) of the television remote controller 308, the selected and designated selector is emphasized in display (for example, displayed in a special color frame), and the specified selector is clarified (in FIG.8, the "rank" is emphasized by the specific color frame). At this time, when the decision (firm) key of the television remote controller 308 is manipulated, the script process is executed again, and the selected and designated additional information screen is displayed. For example, when the decision (firm) key is pressed while the rank is emphasized in special color frame, the additional information screen of rank is displayed as shown in FIG. 9 (steps S5 and S6 in FIG. 2).

Figure 11:
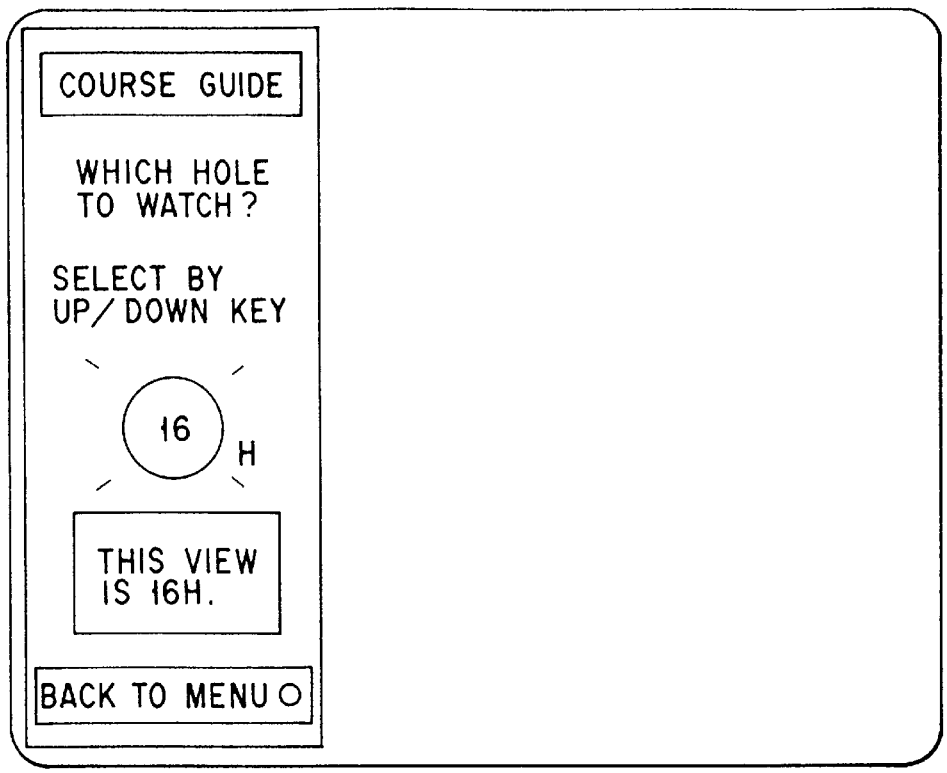
FIG. 11 is a diagram showing an example of screen display in the first embodiment.
Figure 12:
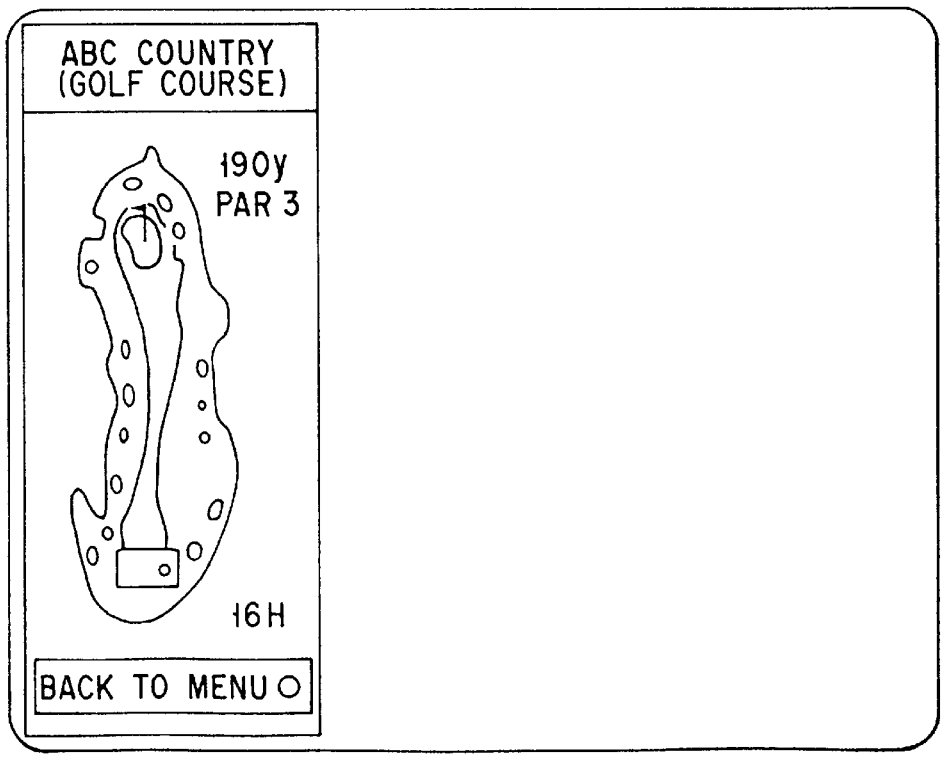
FIG. 12 is a diagram showing an example of screen display in the first embodiment.
Figure 15:
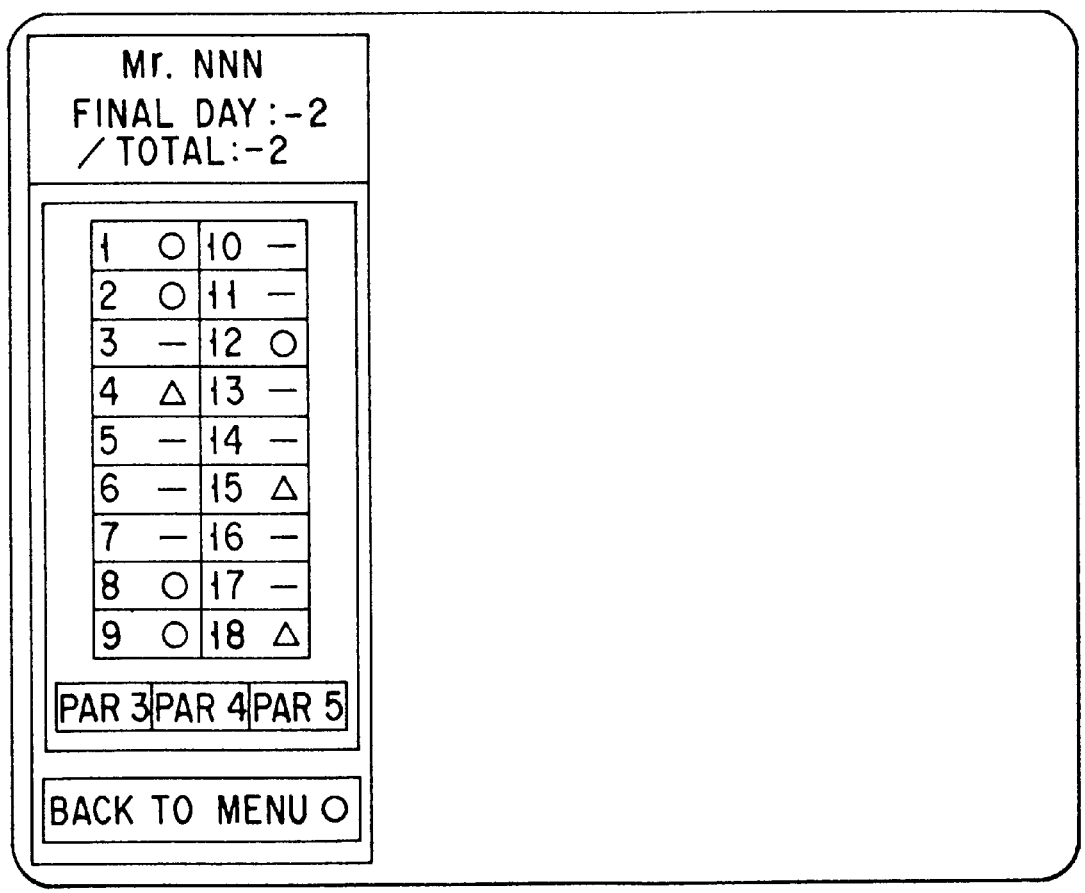
FIG. 15 is a diagram showing an example of screen display in the first embodiment.
Figure 18:
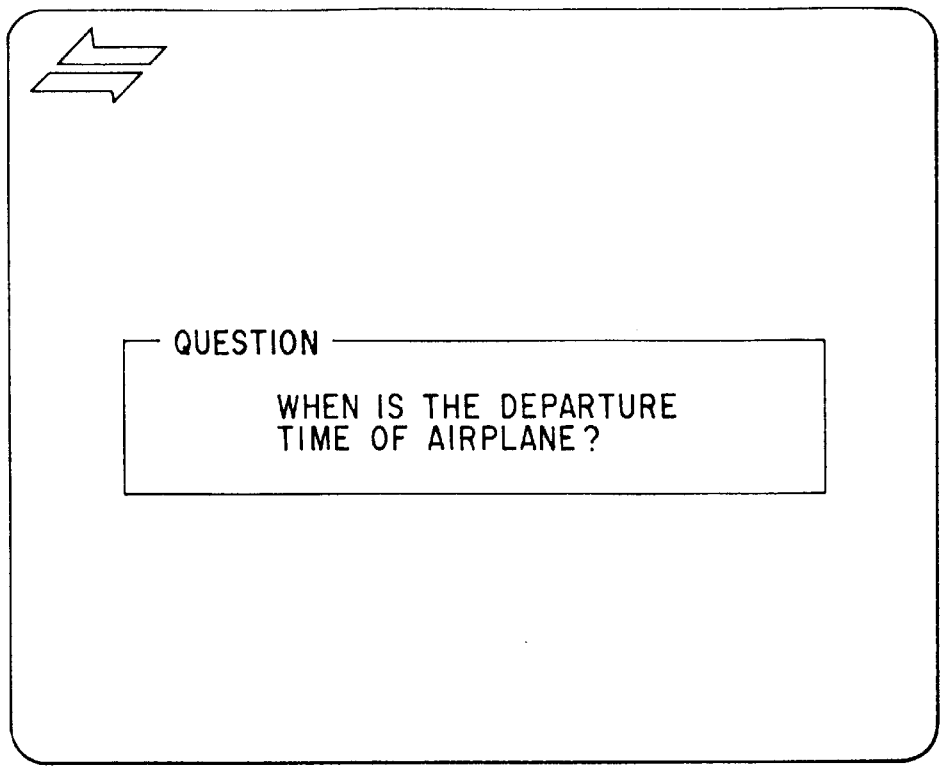
FIG. 18 is a diagram showing an example of screen display in the first embodiment.
Figure 19:
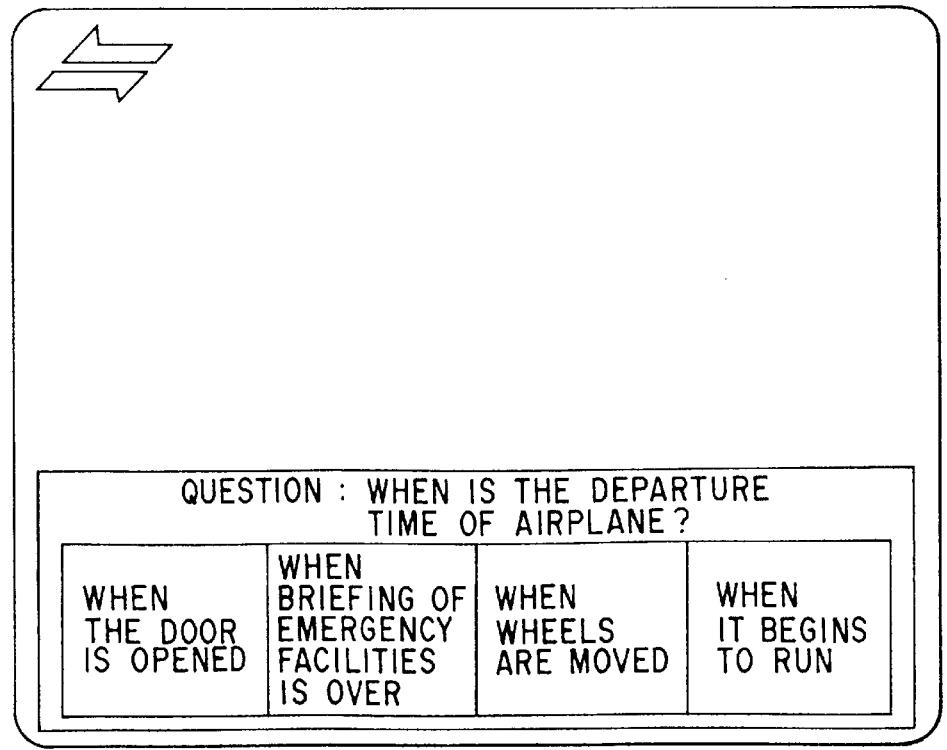
FIG. 19 is a diagram showing an example of screen display in the first embodiment.
Figure 20:
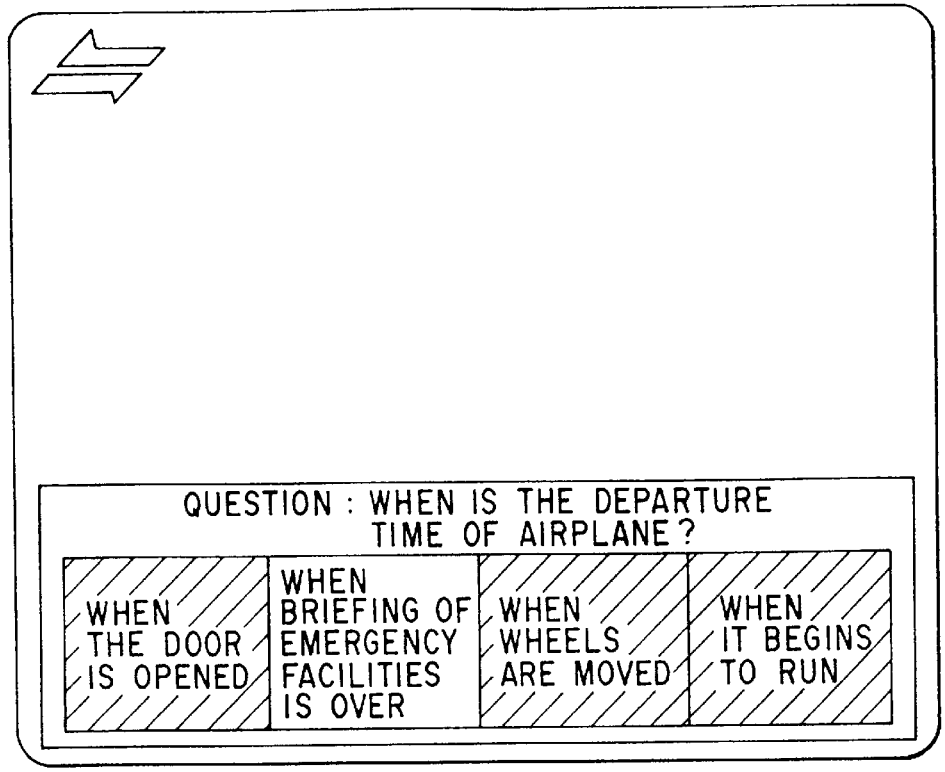
FIG. 20 is a diagram showing an example of screen display in the first embodiment.
Figure 21:
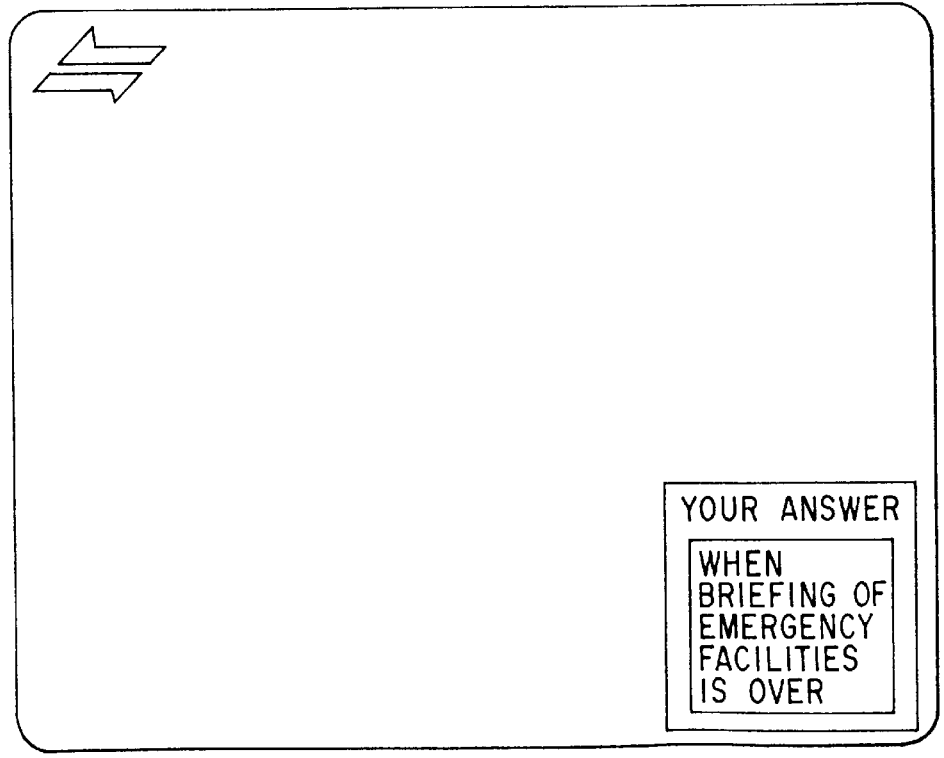
FIG. 21 is a diagram showing an example of screen display in the first embodiment.

Or, when the decision (firm) key is manipulated when the course is emphasized in special color frame on the additional information selection screen shown in FIG. 8, the additional information screen of course guide is displayed as shown in FIGS. 10 and 11, and further when a direction command key (down key) is manipulated, as shown in FIG. 12., the additional information screen of course layout is displayed. When the decision (firm) key is manipulated while the score is emphasized in special color frame on the additional information selection screen shown in FIG. 8, as shown in FIGS. 13 and 14, the additional information screen of score is displayed. Moreover, when an arbitrary player is selected on the screen display shown in FIG. 14 (in the first embodiment, the fourth player from the left, the rank enclosed by double square), further specific information is displayed as shown in FIG. 15.

Similarly, in a quiz program, the additional information of the quiz program is displayed in the screen transition as shown in FIGS. 16 to 22. Herein, the right answer information is preliminarily built in the reception script, and according to the selection operation of selector by manipulation of the television remote controller 308 by viewer, it is judged if the reply is correct or not by the CPU 301 on the basis of the received right answer information, and the result of judgment is displayed on the screen.

By such interactive function using the television as the medium, versatile and specific additional information can be presented timely, by linking with the on-screen program such as live sports game, news and quiz.

If desired to save additional information, while displaying the additional information screen desired to be saved, by pressing the memory key of the television remote controller 308, the data of the desired additional information screen is stored in the save region of the display memory (VRAM) 304, and it can be freely displayed again by a specific key operation (for example, simultaneous pressing of i key and memory key).

Moreover, the image data stored in the save region of the display memory (VRAM) 304 can be transferred into an external device, such as magnetic disk drive or printer, through an external device connection port (not shown).

By specific key input manipulation of the television remote controller 308, the information registered in the registration setting unit [PS] of machine control and individual identification information of the ROM 302 can be transmitted through the modem 34 by automatically dialing to the line connection destination (for example, server 4) given from the interactive teletext decoder (built in the reception script).

Thus, the first embodiment presents an interactive television system of complementary information display type that is easily realized without demanding large extra cost to the broadcasting station and users, by making effective use of the existing infrastructure for selection of information by the user, that is, the interactive function, which is one of the features of multimedia information.

That is, as the existing infrastructure, the broadness in coverage and rapidity in reporting which are basic features of television broadcast, coding transmission system in vertical blanking interval (VBI) of television broadcast, and public telephone line are utilized effectively, and in an economically advantageous system, still more, the interactive television system of complementary information display type capable of presenting specific information timely by linking with the program is presented.

A second embodiment of the invention is described below.

Figure 23:
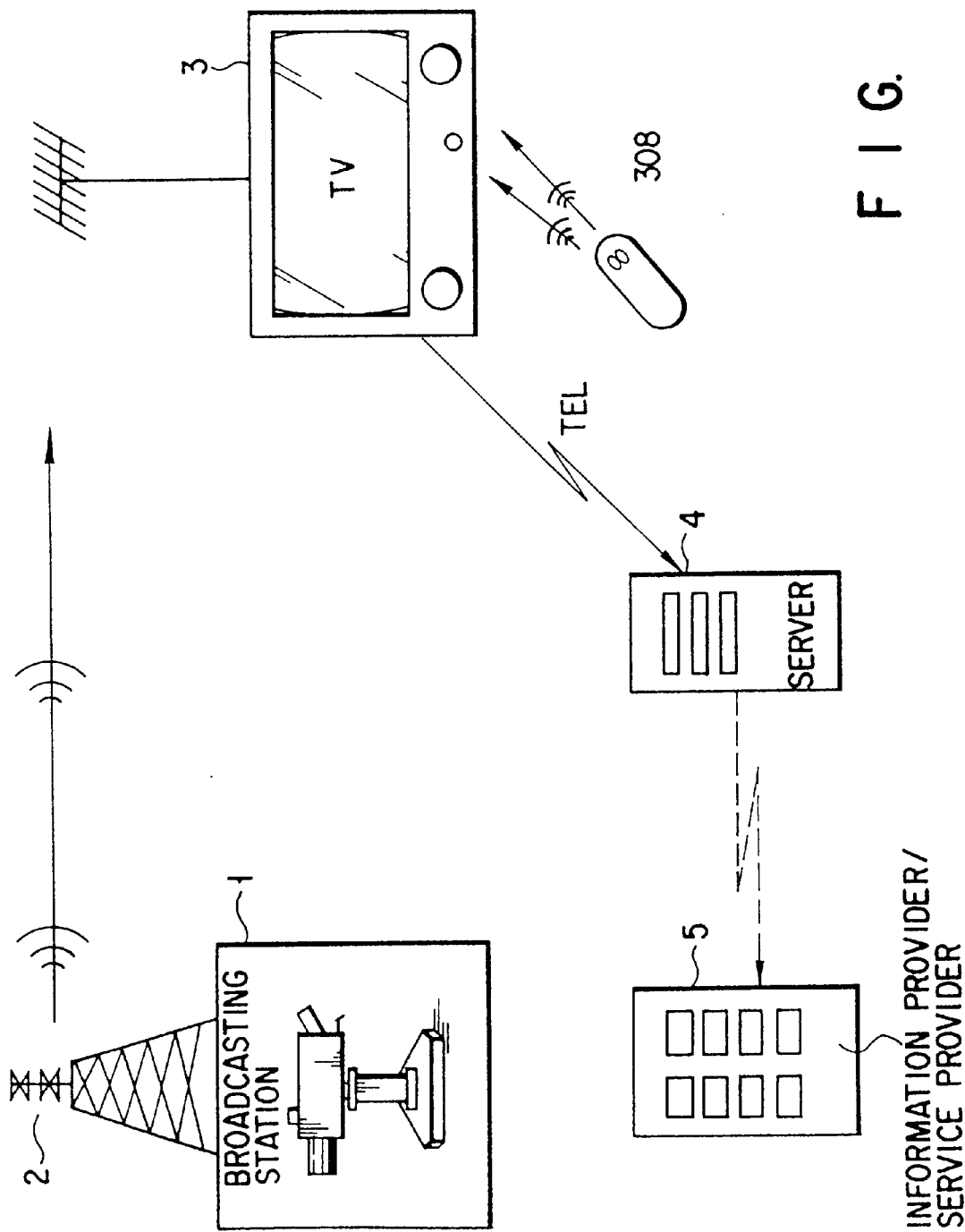
FIG. 23 is a block diagram showing a constitution of an interactive television system of virtual channel type according to a second embodiment of the invention.

FIG. 23 is a diagram showing a system configuration for explaining the outline of the second embodiment.

The second embodiment is an interactive television system of virtual channel type enabling to exchange information independently of the main broadcast, in which from the transmission antenna 2 of the broadcasting station 1, script (and screen control information) for presenting an independent subsidiary image information not relating with the main broadcast is transmitted in the vertical blanking interval (VBI) of the main broadcasting program. In FIG. 23, same reference numerals are given to same constituent elements as in FIG. 1, and detailed description of the constituent elements is omitted. The definition of the script is same as in the first embodiment.

As the feature of the second embodiment, the broadcasting station 1 incorporates a transmitter for transmitting the script for presenting plural types of additional information independent of the main broadcast in the vertical blanking interval included in the video signal, and the television receiver 3 comprises a script execution processing unit, and a sending unit for sending out the transfer data conforming to the additional information to the receiver, or to the transfer destination conforming to the transfer destination information built in the script together with the individual identification information to the individual viewer, and hence the information of virtual channel independent of the main broadcast can be presented to the viewer.

At this time, the additional information that can be displayed by the reception script includes, for example, presentation of program selection menu of teletext, merchandise transaction including catalog request and purchase of merchandise, and various subscription procedures.

FIG. 24 is a diagram showing an example of processing procedure in the interactive television system of virtual channel type mentioned above.

In FIG. 24, step S11 shows transmission process of television wave for teletext (coded transmission type teletext) in the broadcasting station 1, and herein showing the process of transmission of script (herein, the script is meant to include the header, form and resource, as well as the script main body (program) describing the process procedure) for presenting plural types of additional information not relating to the main broadcast in the vertical blanking interval (VBI) included in the video signal of the main broadcast.

Step S12 shows the process of receiving the television wave in the interactive television receiver (TV) 3, and storing (buffering) the reception script.

Step S13 shows the process of sending out a display output request signal of additional information by manipulating the television remote controller 308.

Step S14 shows the process of executing the script according to the display output request of additional information from the viewer, creating additional information selection screen for selecting desired additional information from plural types of additional information, and displaying in part of the display screen.

Step S15 shows the process of manipulation of the television remote controller 308 by the viewer for sending out the additional information selection instruction signal.

Step S16 shows the process of displaying the detailed screen of the selected and instructed additional information according to the additional information selection instruction from the viewer.

Step S17 shows the process of displaying the screen for confirming the additional information finally selected and instructed, confirming it, and transmitting the information to the server 4.

Step S18 shows the process of sending the information of the interactive television receiver (TV) 3 to the server 4.

By this interactive function using the television as the medium, for example, various information can be exchanged, for example, presentation of program selection menu of teletext, merchandise transaction including catalog request and purchase of merchandise, and various subscription procedures.

The constitution of the parts in the interactive television system of virtual channel type in the second embodiment is same as in the first embodiment, and detailed description is omitted (see FIG. 3).

The internal structure of the multimedia teletext receiver 33 in the second embodiment is also same as in the first embodiment, and detailed description is omitted (see FIGS. 4 and 5).

The transmission timing of control data (script and screen control information) in the second embodiment is also same as in the first embodiment, and detailed description is omitted (see FIGS. 6A and 6B).

Herein, an example of operation of the second embodiment is described.

From the transmission antenna 2 of the broadcasting station 1, in the transmission format as shown in FIGS. 6A and 6B, the script and the television wave for teletext (coded transmission type teletext) incorporating transfer destination information (for example, telephone number) in the script are transmitted in the VBI (step S11 in FIG. 24).

Herein, in the vertical blanking interval (VBI) included in the video signal of main broadcast, the script for presenting plural types of additional information independent of the main broadcast (including the script main body (program) describing the processing procedure, header, form, and resource), and the telephone number incorporated in the script are transmitted.

The interactive television receiver (TV) 3 receives the television wave (broadcast wave) carrying shopping information by the virtual channel, and stores (buffers) the reception script included in the broadcast wave. That is, the multimedia teletext receiver 33 provided in the interactive television receiver (TV) 3 discriminates and takes in the VBI data from the received broadcast wave, and separates into the data of ordinary teletext program and data of interactive teletext program (herein, the data of plural types of additional information independent of main broadcast), and generates display data of ordinary teletext program and display data of plural types of additional information independent of the main broadcast, and stores (buffers) them in the RAM 305 (step S12 in FIG. 24).

Herein, when the viewer manipulates the mode selection key (i key) of the television remote controller 308 and makes the interactive mode valid, the "i" mark appears in the upper left corner of the display unit (CRT) 32, telling that the interactive mode is valid (step S13 in FIG. 24).

Furthermore, along with the manipulation of the mode selection key (i key), by the execution of the script process by the interactive teletext decoder realized by execution of the process of script process module [SCR] in the ROM 302 by the CPU 301, for example, an additional information selection screen is displayed (step S14 in FIG. 24).

On this additional information selection screen, as the viewer manipulates the direction command key (herein left key or right key) of the television remote controller 308, the selected and designated selector is emphasized in display (for example, displayed by flickering), and the specified selector is clarified. At this time, when the decision (firm) key is manipulated while the selector for shopping is emphasized (by flickering), the screen for introduction and selection of plural types of additional information is displayed (steps S15, S16 in FIG. 24).

Furthermore, on this screen for introduction and selection of plural types of additional information, when a certain additional information is selected and specified, a screen appears to display the detail of selected additional information, and when "revise" is selected on this screen, it returns to the aforementioned screen.

On the screen for confirmation of detail of selected additional information, when "confirm" (order) is selected, the selection information is automatically transmitted to the server 4 through the modem 34 and telephone line (steps S17, S18 in FIG. 24). As a result, the server 4 confirms that the viewer has ordered the desired additional information through the interactive TV receiver 3, and the corresponding processing is executed.

The plural types of additional information includes shopping information, for example, ranges widely including jewelry, food, clothes, real estate, and others, and in the interactive system offering transaction services in plural types, it is also possible to transmit automatically by using different telephone numbers by the trade and trader. In this case, plural telephone numbers set individually by trade and trader are incorporated in the transmission script, and when the transaction is formed at the interactive TV receiver side 3, the telephone number corresponding to the trade and trader corresponding to the transaction is sent out to the modem 34, so that transaction service using plural telephone lines can be realized.

By specific key input manipulation of the television remote controller 308, the information registered in the registration setting unit [PS] of machine control and individual identification information of the ROM 302 can be transmitted through the modem 34 by automatically dialing to the line connection destination (for example, server 4) given from the multimedia teletext receiver 33 (built in the reception script).

Thus, the second embodiment constructs an interactive television system of virtual channel type for general household in an economically advantageous system configuration, by effectively utilizing the broadness in coverage and rapidity in reporting which are basic features of television broadcast, coding transmission system in vertical blanking interval (VBI) of television broadcast, and public telephone line as the existing infrastructure.

A third embodiment of the invention is described below.

Figure 25:
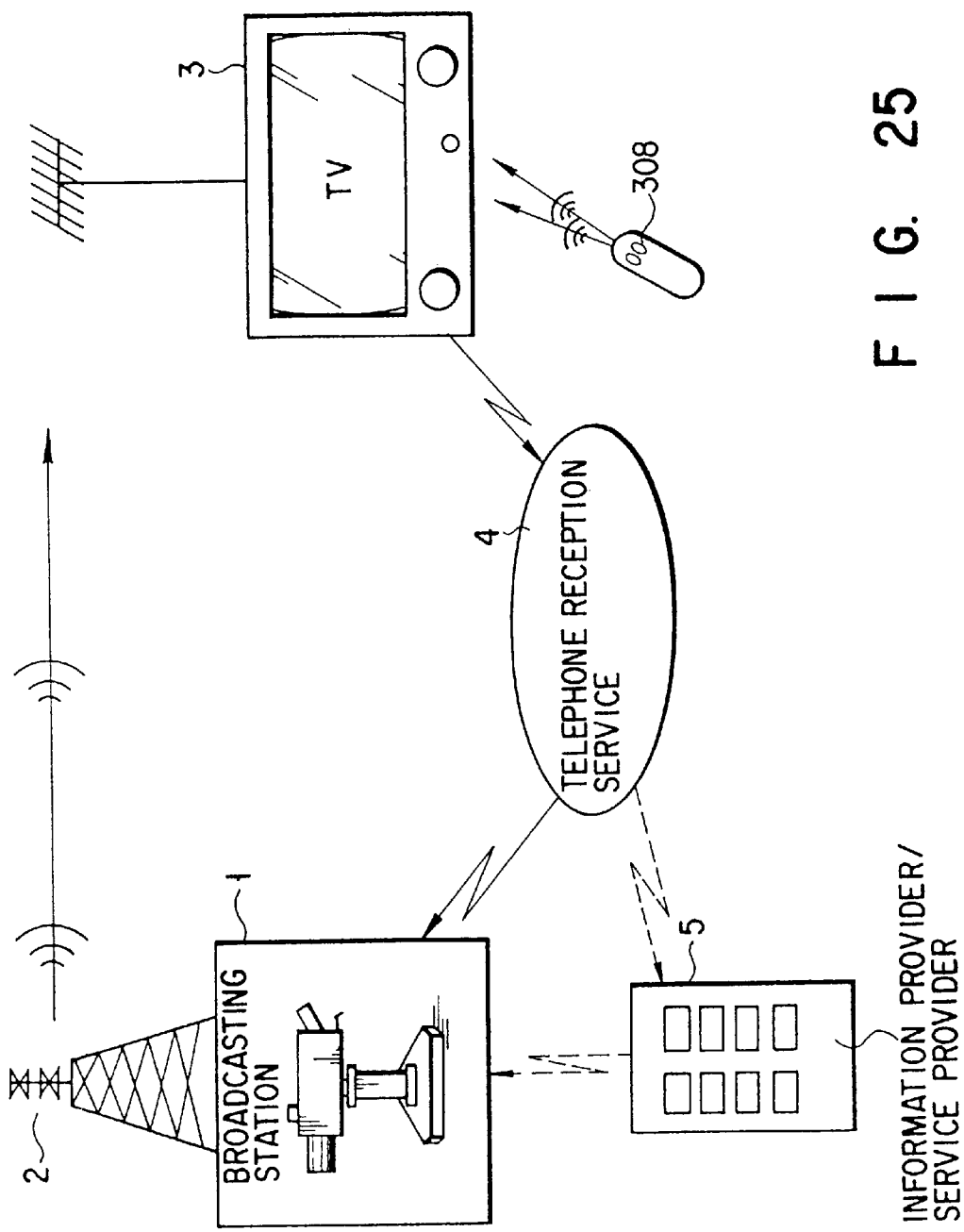
FIG. 25 is a block diagram showing a constitution of an interactive television system of viewer participation type according to a third embodiment of the invention.

FIG. 25 is a diagram showing a system configuration for explaining the outline of the third embodiment.

The third embodiment is an interactive television system of a type of broadcasting programs participated by viewer of televisions, for enabling to exchange information about main broadcast, in which from the transmission antenna 2 of the broadcasting station 1, script (and screen control information) for presenting a subsidiary image information for participation of viewers relating with the main broadcast is transmitted in the vertical blanking interval (VBI) of the main broadcasting program. In FIG. 25, same reference numerals are given to same constituent elements as in FIG. 1, and detailed description of the constituent elements is omitted. The definition of the script is same as in the first embodiment.

In the third embodiment, by the reception script by the received teletext signal, the existing teletext program is further developed, and information can be exchanged by presenting various types of additional information, such as quiz program participated by viewers of the televisions relating to the on-screen program, interviews and others, on the basis of the reception script for displaying additional information.

That is, in the third embodiment, it is intended to connect the interactive TV receiver 3 to telephone reception service 4 having accumulate processing function automatically through a telephone line, so that the content of the main broadcast (on-screen program) such as quiz and interview can be automatically transmitted by simple manipulation such as television remote controller, allowing many viewers to participate in the program.

FIG. 26 is a diagram showing an example of processing procedure in the interactive television system of the above type of broadcasting programs participated by viewers of the televisions.

In FIG. 26, step S21 shows transmission process of television wave for teletext (coded transmission type teletext) in the broadcasting station 1, and herein showing the process of transmission of script (herein, the script is meant to include the header, form and resource, as well as the script main body (program) describing the process procedure) for viewer response procedure of, for example, quiz or interview, relating to the main broadcast in the vertical blanking interval (VBI) included in the video signal of the main broadcast.

Step S22 shows the process of receiving the television wave in the interactive television receiver (TV) 3, and storing (buffering) the reception script.

Step S23 shows the process of sending out a request signal for allowing the viewers to participate in the program such as quiz or interview, by manipulating the television remote controller 308 by the viewer.

Step S24 shows the process of executing the script according to the participation request from the viewer, creating a request input screen according to the additional information, and displaying in part of the display screen.

Step S25 shows the process of manipulation of the television remote controller 308 by the viewer for inputting the response information.

Step S26 shows the process of displaying the confirmation screen according to the response content from the viewer.

Step S27 shows the process of transmitting the response content of the viewer to the telephone reception service 4.

Step S28 shows the process of accumulating the response contents from the viewers.

Step S29 shows the process of sending back the accumulation result to the broadcasting station 1.

By this interactive function using the television as the medium, for example, response contents to the main broadcast (on-screen program) such as quiz and interview can be automatically transmitted by simple manipulation of the television remote controller, so that the viewer can participate in the main broadcasting program easily.

Figure 27:
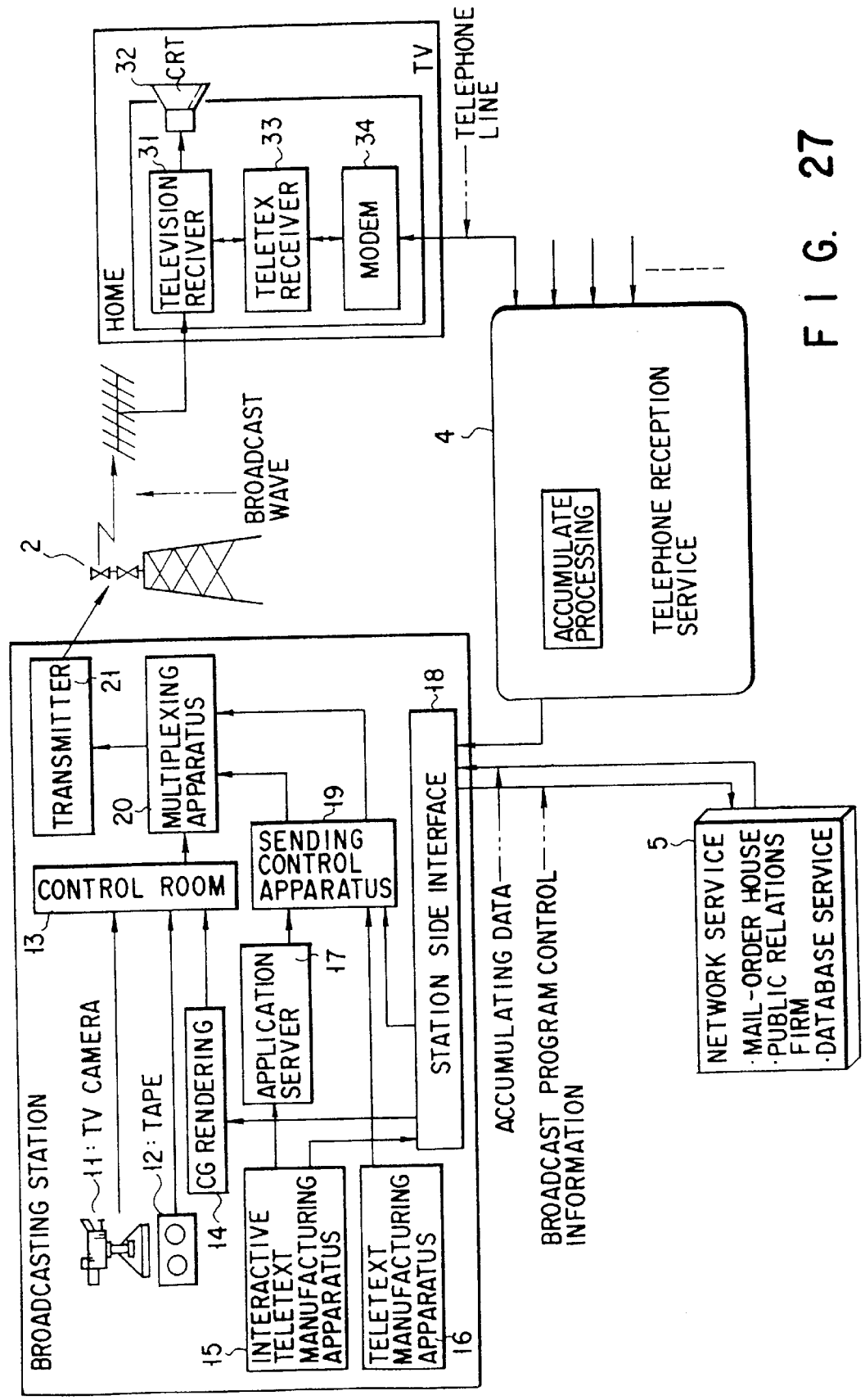
FIG. 27 is a block diagram showing the constitution of parts shown in FIG. 29 in the third embodiment.

FIG. 27 is a block diagram showing the constitution of the parts in the interactive television system of a type of broadcasting programs participated by viewers of the televisions according to this embodiment, and same parts as in FIG. 25 are identified with same reference numerals, and their explanation is omitted.

Herein, the modem 34 is used for connecting the multimedia teletext receiver 33 to the public telephone line, and through this modem 34, the data handled in the multimedia teletext receiver 33 can be transmitted by automatically dialing to the line connection destination given by the interactive teletext decoder of the receiver 33 (built in the reception script), for example, to the telephone reception service 4 having the accumulate processing function. That is, by specific key input operation of the television remote controller 308, the information registered in the registration setting unit [PS] of machine control and individual identification information of the ROM mentioned below can be transmitted through the modem 34 by automatically dialing to the line connection destination or the telephone reception service 4 given from the interactive teletext decoder (built in the reception script).

The internal structure of the multimedia teletext receiver 33 in this third embodiment is also similar to that in the first embodiment, and detailed description is omitted (see FIGS. 4 and 5).

The transmission timing of the control data in the third embodiment (script and screen control information) is also same as in the first embodiment, and detailed description is omitted (see FIGS. 6A and 6B).

An example of operation of the third embodiment is described below.

From the transmission antenna 2 of the broadcasting station 1, in the transmission format as shown in FIGS. 6A and 6B, the script and the television wave for teletext (coded transmission type teletext) incorporating transfer destination information (for example, telephone number) in the script are transmitted in the VBI (step S21 in FIG. 26).

Herein, in the vertical blanking interval (VBI) included in the video signal of main broadcast, the script for presenting plural types of additional information independent of the main broadcast (including the script main body (program) describing the processing procedure, header, form, and resource), and the telephone number incorporated in the script are transmitted.

In this example, a quiz program participated by viewers is transmitted.

The interactive television receiver (TV) 3 receives the television wave (broadcast wave) carrying the quiz program participated by viewers of the televisions, and stores (buffers) the reception script included in the broadcast wave. That is, the multimedia teletext receiver 33 provided in the interactive television receiver (TV) 3 discriminates and takes in the VBI data from the received broadcast wave, and separates into the data of ordinary teletext program and data of interactive teletext program (herein, the data of plural types of additional information independent of main broadcast), and generates display data of ordinary teletext program and display data of plural types of additional information independent of the main broadcast, and stores (buffers) them in the RAM 305 (step S22 in FIG. 26).

Herein, when the viewer manipulates the mode selection key (i key) of the television remote controller 308 and makes the interactive mode valid, the "i" mark appears in the upper left corner of the display unit (CRT) 32, telling that the interactive mode is valid (step S23 in FIG. 26).

Furthermore, along with the manipulation of the mode selection key (i key), by the execution of the script process by the interactive teletext decoder realized by execution of the process of script process module [SCR] in the ROM 302 by the CPU 301, for example, a response input screen having plural selectors by participation of viewers in the quiz of the on-screen program is displayed (step S24 in FIG. 26).

On this response input screen, as the viewer manipulates the direction command key of the television remote controller 308, the selected and designated selector is emphasized in display (for example, displayed by flickering), and the specified selector is clarified (steps S25, S26 in FIG. 26).

Furthermore, on this response input screen, when the "decision" key is manipulated, the response content of the viewer is transmitted to the telephone reception service 4 (step S27 in FIG. 26).

The process of transmitting to the telephone reception service 4 is transmitted by automatic dialing using the telephone number contained in the script, and at this time there are means for transmitting the response information automatically by using a common telephone number and means for transmitting automatically by varying the telephone number for every content of response (selector). In the means for transmitting automatically by varying the telephone number for every content of response (selector), an individual telephone number is assigned for every response of each selector and preliminarily contained in the script, and when the CPU 301 of the interactive TV receiver 3 transmits to the telephone reception service 4, the telephone reception service 4 is called by the individual telephone number for the response content (selector).

The telephone reception service 4 receives the response information from multiple interactive TV receivers 3 in the telephone line by the common telephone number or in the telephone line by the individual telephone number in every response content (selector), and transmits the accumulated information to the broadcasting station 1 (or network service 5) (steps S28, S29 in FIG. 26).

In this way, by the interactive function through the medium of television, the response content to, for example, the main broadcast (on-screen program) such as quiz or interview, can be transmitted automatically by simple operation of the television remote controller, and the viewer can easily participate in the main broadcasting program.

Thus, the third embodiment constructs an interactive television system of a type of broadcasting programs participated by viewers of the televisions for general household in an economically advantageous system configuration, by effectively utilizing the broadness in coverage and rapidity in reporting which are basic features of television broadcast, coding transmission system in vertical blanking interval (VBI) of television broadcast, and public telephone line as the existing infrastructure.

A fourth embodiment of the invention is described below.

FIG. 28 is a diagram showing a system configuration for explaining the outline of the fourth embodiment.

The fourth embodiment is an interactive television system of response feedback type enabling to exchange information about main broadcast, in which from the transmission antenna 2 of the broadcasting station 1, script (and screen control information) for presenting a subsidiary image information of response feedback type relating with the main broadcast is transmitted in the vertical blanking interval (VBI) of the main broadcasting program. In FIG. 28, same reference numerals are given to same constituent elements as in FIG. 1, and detailed description of the constituent elements is omitted.

In the fourth embodiment, by the reception script by the received teletext signal, the existing teletext program is further developed, and various additional information such as the quiz program of response feedback type about the on-screen program, interview, catalog request guide, merchandise purchase guide, mailing guide, ticket reservation guide and others can be presented by the instruction of the viewer, on the basis of the reception script for displaying additional information, and each information exchange is done arbitrarily and selectively only by the manipulation of the television remote controller.

That is, in the fourth embodiment, it is intended to connect the interactive TV receiver 3 to the server 4 having accumulate processing function automatically through a telephone line, so that the content of response to the main broadcast (on-screen program) such as quiz and interview can be automatically transmitted by simple manipulation such as television remote controller, allowing many viewers to participate in the program easily.

Moreover, by providing the server 4 with, for example, the merchandise transaction processing function of executing the reception process of the specified merchandise or specified commodity ordered by the viewer, and acquiring the address information of the ordering viewer by retrieval of subscriber database by identification information, varied transaction procedures such as catalog request, merchandise purchase, mailing, and ticket reservation can be done easily by simple manipulation of the television remote controller.

FIG. 29 is a diagram showing an example of processing procedure in the interactive television system of the above response feedback type.

In FIG. 29, step S31 shows transmission process of television wave for teletext (coded transmission type teletext) in the broadcasting station 1, and herein showing the process of transmission of script (herein, the script is meant to include the header, form and resource, as well as the script main body (program) describing the process procedure) for viewer response procedure of, for example, quiz or interview, relating to the main broadcast in the vertical blanking interval (VBI) included in the video signal of the main broadcast.

Step S32 shows the process of receiving the television wave in the interactive television receiver (TV) 3, and storing (buffering) the reception script.

Step S33 shows the process of sending out a request signal for participating in the program such as quiz or interview by response feedback type, by manipulating the television remote controller 308 by the viewer.

Step S34 shows the process of executing the script according to the participation request from the viewer, creating a response input screen according to the additional information, and displaying in part of the display screen.

Step S35 shows the process of manipulation of the television remote controller 308 by the viewer for inputting the response information.

Step S36 shows the process of displaying the confirmation screen according to the response content from the viewer.

Step S37 shows the process of transmitting the response content of the viewer to the server 4.

Step S38 shows the process of sending the response content from the viewer by dialing automatically to the telephone number information of the line connection destination extracted from the reception script.

Step S39 shows the process of transmitting the response content from the viewer to the server 4. Herein, the identification information (ID number) preliminarily assigned to the receiver 3 and the response content are sent to the server 4.

Steps S40 and S42 show the loop of feedback for sending back the data processed in the server 4 to the broadcasting station 1 by processing in the network service (information provider/service provider) 5, and the loop of data exchange of setting condition, processing condition, parameter condition, etc. between the broadcasting station 1 and server 4 and network service (information provider/service provider) 5, and step S41 shows the loop of feedback of the data processed in the server 4 directly to the broadcasting station 1.

By this interactive information exchange function using the television as the medium, for example, response contents to the main broadcast (on-screen program) such as quiz and interview can be automatically transmitted by simple manipulation of the television remote controller, so that the viewer can participate in the main broadcasting program easily.

Moreover, by providing the server 4 with, for example, the merchandise transaction processing function of executing the reception process of specified merchandise or specified commodity ordered by the viewer, and acquiring the address information of the ordering viewer by retrieval of subscriber database according to the identification information, varied transaction procedures such as catalog request, merchandise purpose, mailing, and ticket reservation can be executed easily by simple manipulation of the television remote controller.

The constitution of the parts in the interactive television system of response feedback type of the fourth embodiment is same as in the first embodiment, and detailed explanation is omitted (see FIG. 3).

The internal structure of the multimedia teletext receiver 33 in the fourth embodiment is also similar to that in the first embodiment, and detailed description is omitted (see FIGS. 4 and 5).

The transmission timing of the control data in the fourth embodiment (script and screen control information) is also same as in the first embodiment, and detailed description is omitted (see FIGS. 6A and 6B).

An example of operation of the fourth embodiment is described below.

From the transmission antenna 2 of the broadcasting station 1, in the transmission format as shown in FIGS. 6A and 6B, the script and the television wave for teletext (coded transmission type teletext) incorporating transfer destination information (for example, telephone number) in the script are transmitted in the VBI (step S31 in FIG. 29).

Herein, in the vertical blanking interval (VBI) included in the video signal of main broadcast, the script for presenting plural types of additional information relating to the main broadcast (including the script main body (program) describing the processing procedure, header, form, and resource), and the telephone number of transfer destination of the additional information program incorporated in the script are transmitted.

In this example, a merchandise introduction and guide program enabling to purchase commodities and request catalog by response feedback is transmitted.

The interactive television receiver (TV) 3 receives the television wave (broadcast wave) carrying the merchandise introduction and guide program by response feedback type, and stores (buffers) the reception script included in the broadcast wave. That is, the multimedia teletext receiver 33 provided in the interactive television receiver (TV) 3 discriminates and takes in the VBI data from the received broadcast wave, and separates into the data of ordinary teletext program and data of interactive teletext program (herein, the data of plural types of additional information independent of main broadcast), and generates display data of ordinary teletext program and display data of plural types of additional information independent of the main broadcast, and stores (buffers) them in the RAM 305 (step S32 in FIG. 29).

Herein, when the viewer manipulates the mode selection key (i key) of the television remote controller 308 and makes the interactive mode valid, the "i" mark appears in the upper left corner of the display unit (CRT) 32, telling that the interactive mode is valid (step S33 in FIG. 29).

Furthermore, along with the manipulation of the mode selection key (i key), by the execution of the script process by the interactive teletext decoder realized by execution of the process of script process module [SCR] in the ROM 302 by the CPU 301, for example, a response input screen having plural selectors by response feedback to the on-screen program is displayed (step S34 in FIG. 29).

On this response input screen, as the viewer manipulates the direction command key of the television remote controller 308, the selected and designated selector is emphasized in display (for example, displayed by flickering), and the specified selector is clarified (steps S35, S36 in FIG. 29).

Furthermore, on this response input screen, when the "decision" key is manipulated, the response content of the viewer is transmitted to the server 4 (step S37 in FIG. 29).

The process of transmitting to the server 4 is transmitted by automatic dialing using the telephone number contained in the script, and at this time there are means for transmitting the response information automatically by using a common telephone number and means for transmitting automatically by varying the telephone number for every content of response (selector). In the means for transmitting automatically by varying the telephone number for every content of response (selector), an individual telephone number is assigned for every response of each selector and preliminarily contained in the script, and when the CPU 301 of the interactive TV receiver 3 transmits to the server 4, the server 4 is called by the individual telephone number for the response content (selector).

The server 4 receives the response information from multiple interactive TV receivers 3 in the telephone line by the common telephone number or in the telephone line by the individual telephone number in every response content (selector) (steps S38, S39 in FIG. 29).

Further, the server 4 processes the received information by, for example, accumulating, modifying, or updating local database (L-DB) 42A, master database (M-DB) 43A, etc., preliminarily as specified, and transmits the data to the broadcasting station 1 or network service (information provider/service provider) 5 (steps S40, S41 in FIG. 29).

In this way, by the interactive function through the medium of television, the response content to, for example, the main broadcast (on-screen program) such as quiz or interview, can be transmitted automatically by simple operation of the television remote controller, and the viewer can easily participate in the main broadcasting program.

Moreover, by providing the server 4 with, for example, the merchandise transaction processing function of executing the reception process of specified merchandise or specified commodity ordered by the viewer, and acquiring the address information of the ordering viewer by retrieval of subscriber database according to the identification information, varied transaction procedures such as catalog request, merchandise purpose, mailing, and ticket reservation can be executed easily by simple manipulation of the television remote controller.

In FIG. 28, the server 4 and information provider/service provider 5 are different, but it may be also constituted, for example, to include both the information provider/service provider 5 and server 4.

Thus, the fourth embodiment constructs an interactive television system of response feedback type of high utility and excellent controllability for general household in an economically advantageous system configuration, by effectively utilizing the broadness in coverage and rapidity in reporting which are basic features of television broadcast, coding transmission system in vertical blanking interval (VBI) of television broadcast, and public telephone line as the existing infrastructure.

Especially, in the receiver 3, the identification number assigned for the receiver or subscriber is stored, and this identification number is sent to the server 4 together with the response from the viewer (operator). Therefore, in the server 4, the sender of the response data can be identified, and the service can be presented to every viewer according to the identification number.

A fifth embodiment of the invention is described below.

FIG. 30 is a diagram showing a system configuration for explaining the outline of the fifth embodiment.

The fifth embodiment is an interactive television system of so-called broadcast related online type enabling to exchange information about main broadcast, and also to exchange information by utilizing teletext not relating to the main broadcast, in which from the transmission antenna 2 of the broadcasting station 1, script (and screen control information) for presenting a subsidiary image information of broadcast related online is transmitted in the vertical blanking interval (VBI) of the main broadcasting program (on-screen program). In FIG. 30, same reference numerals are given to same constituent elements as in FIG. 1, and detailed description of the constituent elements is omitted. The definition of the script is same as in the first embodiment.

In the fifth embodiment, by the reception script by the received teletext signal, the existing teletext program is further developed, and various additional information for broadcast related online information exchange (for example, educational program, catalog request guide, merchandise purchase guide, mailing guide, ticket reservation guide, local program, and other information exchange) can be presented by the instruction of the viewer, and each information exchange is done arbitrarily and selectively only by the manipulation of the television remote controller.

That is, in this invention, it is intended to connect the interactive TV receiver 3 to the server 4 through a telephone line automatically, so that various information relating to the main broadcast or independent of the main broadcast can be exchanged by connecting the line automatically to the server 4 by simple manipulation of the television remote controller.

By constructing the information exchange mechanism by using the household television receiver as the medium, for example, various information exchange procedures about catalog request, merchandise purchase, mailing, ticket reservation, and educational system with scoring function can be done easily by simple manipulation of the television remote controller.

For example, by providing the server 4 with the subscriber database, the transaction processing function can be realized by executing the reception process of the merchandise designated by the viewer, and acquiring the address information of the viewer by retrieval of the subscriber database according to the identification information, so that varied transaction procedures of catalog request, merchandise purchase, mailing, ticket reservation and others can be done easily by simple manipulation of the television remote controller.

Also by providing the server 4 with the mail exchange and storing mechanism, mails can be exchanged between interactive TV receivers 3.

Moreover, by utilizing the mail exchange function by the interactive TV receiver 3 and server 4, not requiring dial operation or sound (voice) response at all, helper system or emergency report system for general household can be easily constructed.

FIG. 31 is a diagram showing an example of processing procedure in the interactive television system of the above broadcast related online type.

In FIG. 31, step S51 shows transmission process of television wave for teletext (coded transmission type teletext) in the broadcasting station 1, and herein showing the process of transmission of script for displaying an off-screen program in the vertical blanking interval (VBI) included in the video signal of the main broadcast.

Step S52 shows the process of receiving the television wave in the interactive television receiver (TV) 3, and storing (buffering) the reception script.

Step S53 shows the process of requesting information exchange by additional information, by manipulating the television remote controller 308 by the viewer.

Step S54 shows the process of executing the script according to the request from the viewer, creating a menu screen for selection of information exchange according to additional information, and displaying in part of the display screen.

Step S55 shows the process of manipulation of the television remote controller 308 by the viewer for selecting the information exchange service to receive information presentation from the menu screen (for example, educational program, catalog request guide, merchandise purchase guide, mailing guide, ticket reservation guide, local program presentation) by, for example, designation operation of a selector.

Step S56 shows the process of line connection of the request of information exchange service according to the selection data from the viewer to the server 4.

Step S57 shows the process of transmitting the selection data from the viewer by automatically dialing to the server 4 according to the telephone number information of the line connection destination extracted from the reception script.

Step S58 shows the process of presenting (transmitting) the data of information exchange service according to the request from the viewer to the demanding interactive TV receiver 3.

Steps S59 and S60 show the process of utilizing the information exchange service received from the server 4.

Steps S61 and S62 show the process of transmitting the viewer's message to the server 4 during or after use of the information exchange service.

Step S63 shows the process of transmitting the data processed in the response server 4 to the network service (information provider/service provider) 5.

By this interactive information exchange function using the television as the medium, the viewer can receive, by simple button operation of the television remote controller 308, desired information exchange service (for example, educational program, catalog request guide, merchandise purchase guide, mailing guide, ticket reservation guide, local program presentation).

Specifically, by providing the server 4 with, for example, a transaction processing function of executing the reception process of commodity designated by the viewer, and acquiring the address information of the ordering viewer by retrieval of subscriber database (local database (L-DB) 42A and master database (M-DB) 43A) according to the identification information, varied transaction procedures such as catalog request, merchandise purpose, mailing, and ticket reservation can be executed easily by simple manipulation of the television remote controller.

Also by providing the server 4 with the mail exchange and storing mechanism, mails can be exchanged between interactive TV receivers 3.

Moreover, by utilizing the mail exchange function by the interactive TV receiver 3 and server 4, not requiring dial operation or sound (voice) response at all, helper system or emergency report system for general household can be easily constructed.

The constitution of the parts in the interactive television system of broadcast related online type of the fifth embodiment is same as in the first embodiment, and detailed explanation is omitted.

FIG. 32 is a functional block diagram showing an internal structure of multimedia teletext receiver 33 in the fifth embodiment. The constitution of the multimedia teletext receiver 33 shown in FIG. 32 is basically same as that of the first embodiment shown in FIG. 4, and therefore same reference numerals as in FIG. 4 are provided, and detailed description is omitted. The constituent elements relating to the operation of the fifth embodiment are described specifically below.

The memory 302, same as in the first embodiment, is a control memory having a partial reloadable region which is read and accessed by the CPU 301, and stores the basic control program executed by the CPU 301 and fixed information. Herein, the script process module [SCR] for executing script process, teletext process module [CBP] for executing teletext, and others are stored, and there are also registration setting unit [PS] of machine control and individual identification information in which machine individual ID designated in each receiver and individual ID are registered, kanji and character control unit [CHA] in which kanji and characters are stored and controlled, and icon control unit [ICON], among others.

By setting the registration setting unit [PS] of machine control and individual identification information in the reloadable region, in addition to the identification information of machine ID and individual ID, as additional information of individual ID, the family membership, address, name, postal code, birthday, private telephone number, facsimile number, registered mail box number, transfer destination telephone number (or plural numbers), credit card number, driver's permit number, insurance number, citizen code, and various additional information can be provided by controlling the termination. This registration setting unit [PS] of machine control and individual identification information is provided as a backup of the communication control block [CCB] in the RAM 305 mentioned later, and when the communication control block [CCB] in the RAM 305 is updated, the CPU 301 also updates the content in the corresponding registration setting unit [PS] of machine control and individual identification information according to the updating.

The RAM 305 is used in the work memory or the like of the CPU 301, and herein data communication control program [DCOM], picture processing program [PICM], user interface program [USIF], script buffer [SCB], and teletext data buffer are provided among others.

In the nonvolatile memory region supported by battery in the RAM 305, the communication control block [CCB] is provided, and in this communication control block [CCB], individual information stored in the ROM (or set by the viewer through the television remote controller 308), including the telephone number information (TEL-A), transfer destination telephone numbers (TEL-B1, TEL-B2), machine ID (M-ID), and individual ID (P-ID), is set. Moreover, as the additional information of the individual ID (P-ID), family membership ($\alpha$1), address, name, postal code, birthday ($\alpha$2), facsimile number ($\alpha$3), registered mail box number ($\alpha$4), credit card number ($\alpha$5), insurance number ($\alpha$6), citizen code ($\alpha$7), and others can be set.

The communication control block [CCB] can be set or changed only after each information satisfies the specified condition such as input of compound password. The content of the communication control block [CCB] is stored as backup in the registration setting unit [PS] of machine control and individual identification information.

The CPU 301 reads and accesses this communication control block [CCB] in every line connection, and cuts out the information necessary for every transfer from the [CCB] data block, and sends the acquired information to the server 4 at the transfer destination, together with the response data to the transfer destination entered by manipulation of the television remote controller by the viewer.

The transmission timing of the control data in the fifth embodiment (script and screen control information) is also same as in the first embodiment, and detailed description is omitted (see FIGS. 6A and 6B).

FIGS. 33 to 38 show screen transition examples in the fifth embodiment, illustrating an example of shopping by broadcast related online type.

An example of operation of the fifth embodiment is described below.

From the transmission antenna 2 of the broadcasting station 1, in the transmission format as shown in FIGS. 6A and 6B, the script and the television wave for teletext (coded transmission type teletext) incorporating transfer destination information (for example, telephone number) in the script are transmitted in the VBI (step S51 in FIG. 31).

Herein, in the vertical blanking interval (VBI) included in the video signal of main broadcast, the script (including the script main body (program) describing the processing procedure, header, form, and resource) for presenting plural types of additional information corresponding to plural types of information exchange service, and the telephone number of transfer destination of the additional information program incorporated in the script are transmitted.

In this example, the shopping information is transmitted together with the transaction partner telephone number.

The interactive television receiver (TV) 3 receives the television wave (broadcast wave) carrying the broadcast related online program, and stores (buffers) the reception script included in the broadcast wave. That is, the multimedia teletext receiver 33 provided in the interactive television receiver (TV) 3 discriminates and takes in the VBI data from the received broadcast wave, and separates into the data of ordinary teletext program and data of interactive teletext program (herein, the data of plural types of additional information relating to main broadcast), and generates display data of ordinary teletext program and display data of plural types of additional information relating to the main broadcast, and stores (buffers) them in the RAM 305 (step S52 in FIG. 31).

Herein, when the viewer manipulates the mode selection key (i key) of the television remote controller 308 and makes the interactive mode valid, the "i" mark appears in the upper left corner of the display unit (CRT) 32 as shown in FIG. 33, telling that the interactive mode is valid (step S53 in FIG. 31).

Furthermore, along with the manipulation of the mode selection key (i key), by the execution of the script process by the interactive teletext decoder realized by execution of the process of script process module [SCR] in the ROM 302 by the CPU 301, for example, a selection menu screen (shopping selection screen) for information exchange having plural selectors by broadcast related online to the on-screen program is displayed as shown in FIG. 34 (step S54 in FIG. 31).

On this selection menu screen (shopping selection screen) for information exchange, as the viewer manipulates the direction command key (herein left key or right key) of the television remote controller 308, the selected and designated selector is emphasized in display (for example, displayed by flickering), and the specified selector is clarified. At this time, when the decision (firm) key is manipulated while the selector for shopping is emphasized (by flickering), the screen for introduction and selection of shopping information is displayed as shown in FIG. 35 (steps S55, S56 in FIG. 31).

Furthermore, on this screen for introduction and selection of shopping information shown in FIG. 35, when a certain merchandise is selected and specified, a screen as shown in FIG. 36 appears to display the detail of transaction and detail of merchandise, and when "revise" is selected on this screen, it returns to the screen of FIG. 35.

Figure 37:
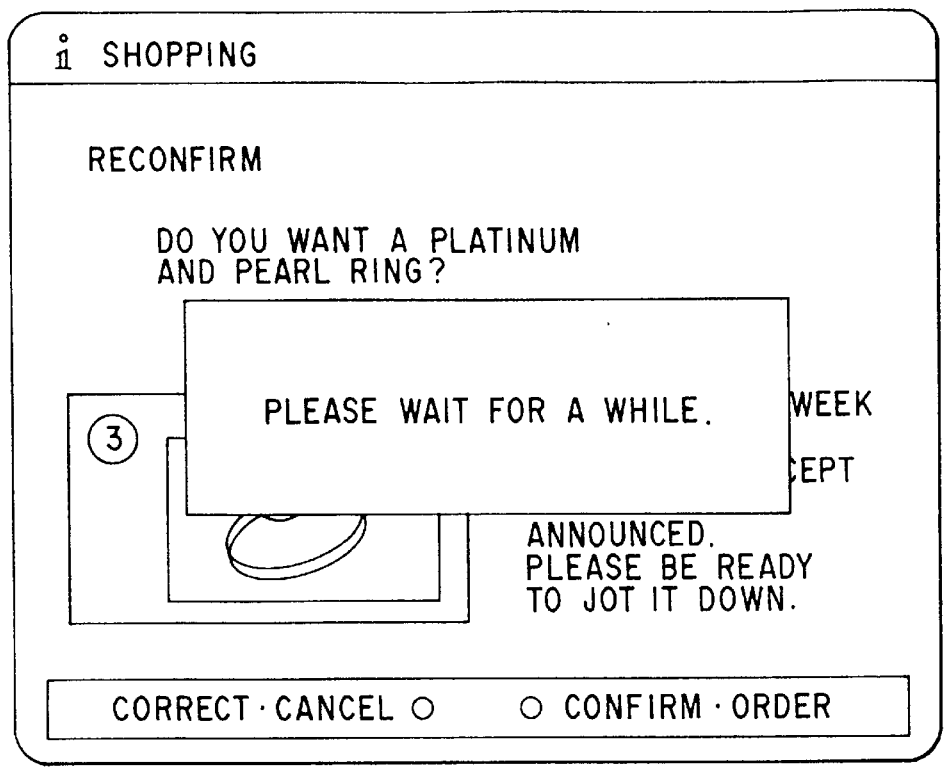
FIG. 37 is a diagram showing an example of screen display in the fourth embodiment.

On the screen for confirmation of detail of transaction and detail of merchandise shown in FIG. 36, when "confirm" (order) is selected, the transaction information is automatically transmitted to the server 4 through the modem 34 and telephone line (steps S57 in FIG. 31). As a result, the server 4 confirms that the viewer has ordered the desired merchandise through the interactive TV receiver 3, and the corresponding processing is executed. At this time, the screen showing the transaction process is displayed as shown in FIG. 37.

The process of transmitting to the server 4 is transmitted by automatic dialing using the telephone number contained in the script, and at this time there are means for transmitting the response information automatically by using a common telephone number and means for transmitting automatically by varying the telephone number for every content of response (selector). In the means for transmitting automatically by varying the telephone number for every content of response (selector), an individual telephone number is assigned for every response of each selector and preliminarily contained in the script, and when the CPU 301 of the interactive TV receiver 3 transmits to the server 4, the CPU 301 originates a call to the server 4 by using the individual telephone number for the response content (selector).

The server 4 receives the response information from multiple interactive TV receivers 3 in the telephone line by the common telephone number or in the telephone line by the individual telephone number in every response content (selector).

Further, the server 4 recognizes the request of the viewer received from the interactive TV receiver 3, and presents (transmits) the information for information exchange service according to the request to the interactive TV receiver 3 (step S58 in FIG. 31).

To be more specific, when the server 4 receives transaction information from the interactive TV receiver 3, the local database (L-DB) 42A is retrieved according to the machine ID or individual ID contained in the information, and confirmation process and registration process according to the transaction content are executed, and when the transaction is established, the information noticing this is sent back to the interactive TV receiver 3 that has made the transaction.

Figure 38:
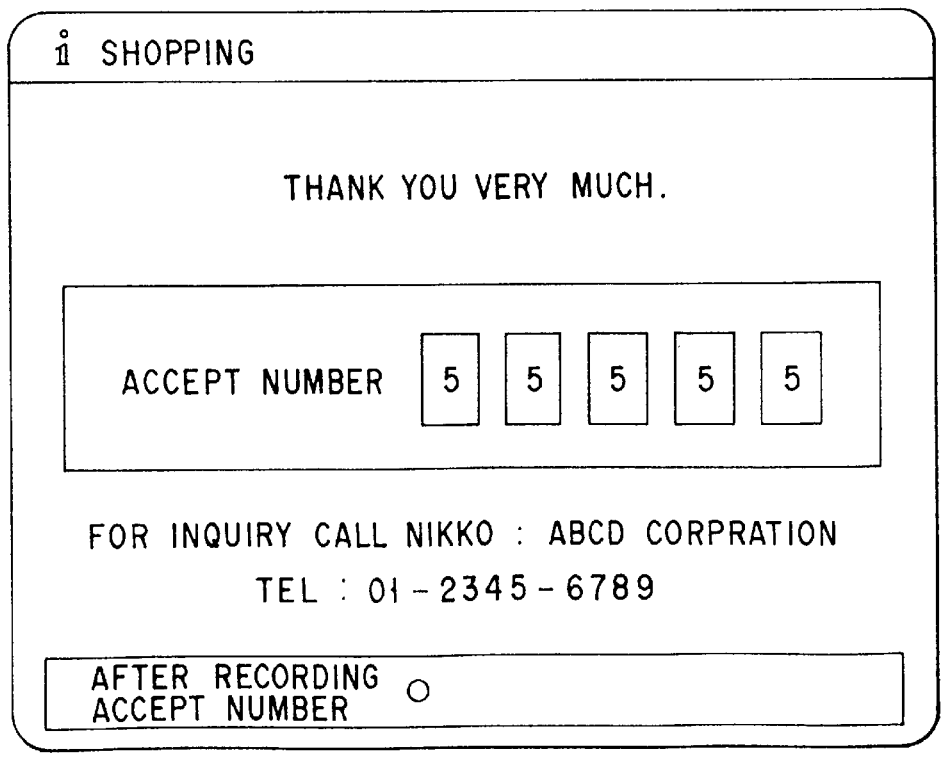
FIG. 38 is a diagram showing an example of screen display in the fourth embodiment.

The interactive TV receiver 3, when receiving the transaction establishment information from the server 4 through the modem 34, displays the screen as shown in FIG. 38 according to the information content.

The viewer utilizes the information exchange service presented from the server 4 through the medium of the interactive TV receiver 3 (steps S59, S60 in FIG. 31).

To terminate the use of this information exchange service, the viewer being presented with the information manipulates, for example, the "menu button" which instructs end of communication of the television remote controller 308, and the information exchange service is terminated, and the selection menu screen for information exchange having plural selectors appears again.

This embodiment relates to an example of single shopping information, but the shopping, for example, ranges widely including jewelry, food, clothes, real estate, and others, and in the interactive system offering transaction services in plural types, it is also possible to transmit automatically by using different telephone numbers by the trade and trader. In this case, plural telephone numbers set individually by trade and trader are incorporated in the transmission script, and when the transaction is confirmed at the interactive TV receiver side 3, the telephone number corresponding to the trade and trader corresponding to the transaction is sent out to the modem 34, so that transaction service using plural telephone lines can be realized.

By the interactive information exchange function by using the general household television receiver as the medium and utilizing the public telephone line, in the system configuration easy to construct and distribute, extremely saving the user's cost, the viewer can receive desired information exchange service (for example, educational program, catalog request, merchandise purchase, mailing, ticket reservation, and local program presentation) by simple button operation of the television remote controller 308.

Specifically, by providing the server 4 with the transaction processing function for executing the reception process of the merchandise designated by the viewer, and acquiring the address information of the viewer by retrieval of the subscriber database (local database (L-DB) 42A, master database (M-DB) 43A) according to the identification information, varied transaction procedures of catalog request, merchandise purchase, mailing, ticket reservation and others can be done easily by simple manipulation of the television remote controller.

Or, by providing the server 4 with the transaction processing function for executing the reception process of the merchandise designated by the viewer, and acquiring the address (address, name, postal code, etc.) information of the demanding viewer by retrieval of the subscriber database according to the identification information, varied transaction procedures of catalog request, merchandise purchase, mailing, ticket reservation and others can be done easily by simple manipulation of the television remote controller.

Also by providing the server 4 with the mail exchange and storing mechanism, mails can be exchanged between interactive TV receivers 3.

Moreover, by utilizing the mail exchange function by the interactive TV receiver 3, not requiring dial operation or sound (voice) response at all, helper system or emergency report system for general household can be easily constructed.

Thus, the fifth embodiment constructs an interactive television system of broadcast related online type of high utility and excellent controllability for general household in an economically advantageous system configuration, by effectively utilizing the broadness in coverage and rapidity in reporting which are basic features of television broadcast, coding transmission system in vertical blanking interval (VBI) of television broadcast, and public telephone line, spread widely as the existing infrastructure.

Especially, if the information to be supplied to the viewer, that is, the interactive TV receiver 3 is an enormous quantity, the system can be built up so as to supply the information as the basis for judgment by the viewer from the broadcasting station 1 same as in the preceding embodiment and supply the divided information by the server 4. As a result, shortage of screen display data or delay of response due to increase of quantity of information can be prevented. When supplying divided information, the identification information used in the fourth embodiment may be utilized, so that adequate information can be presented efficiently.

A sixth embodiment of the invention is described below.

Figure 39:
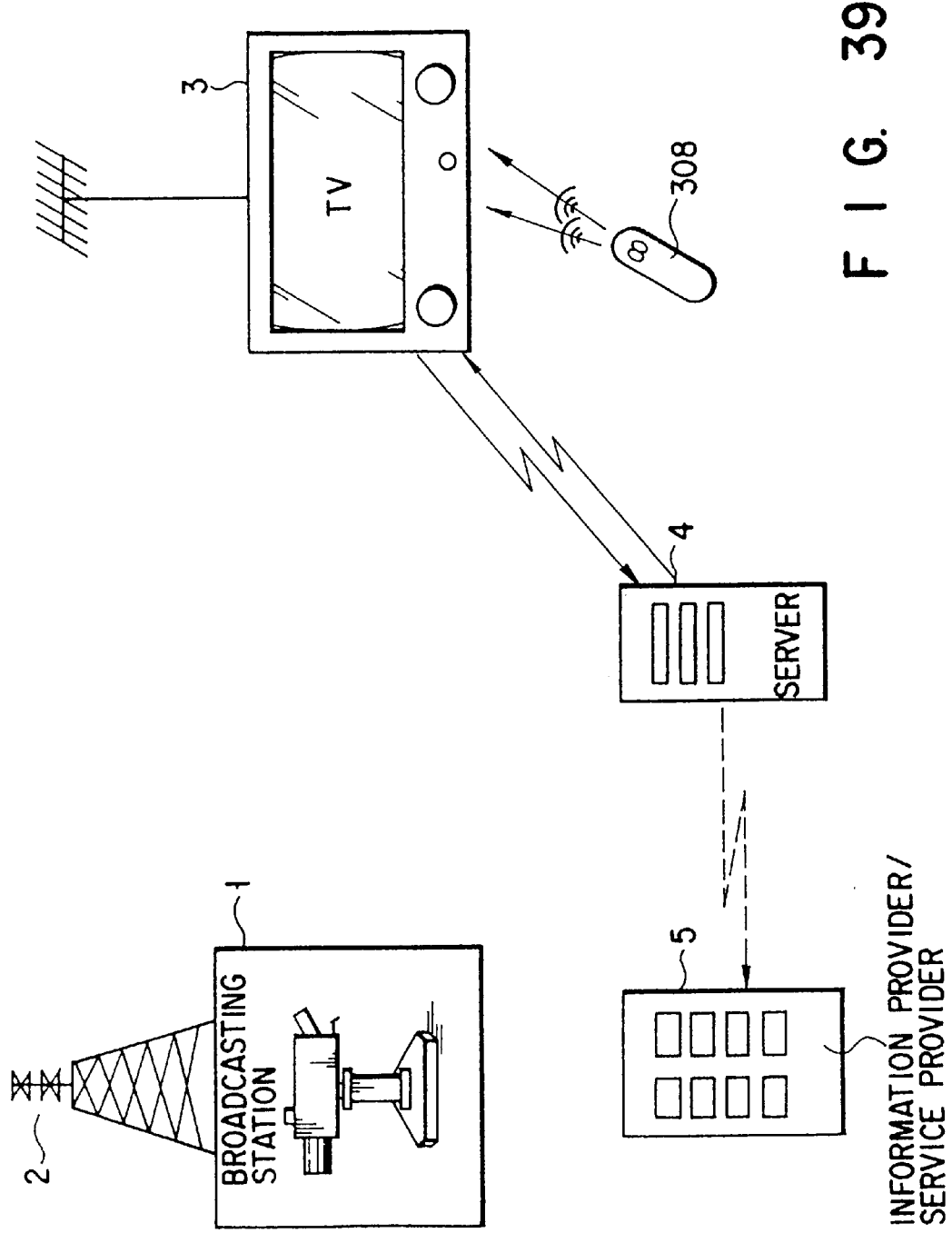
FIG. 39 is a block diagram showing a constitution of an interactive television system of online service type according to a sixth embodiment of the invention.

FIG. 39 is a diagram showing a system configuration for explaining the outline of the sixth embodiment.

The sixth embodiment is an interactive television system of so-called broadcast non-related online type enabling to exchange information not relating to the main broadcast, by using the interactive TV receiver.

From the transmission antenna 2 of the broadcasting station 1, script (and screen control information) for presenting a subsidiary image information of broadcast non-related online is transmitted in the vertical blanking interval (VBI) of the main broadcasting program (on-screen program). In FIG. 39, same reference numerals are given to same constituent elements as in FIG. 1, and detailed description of the constituent elements is omitted. The definition of the script is same as in the first embodiment.

In the invention, completely unrelated to the broadcast, by effectively utilizing the existing infrastructure, bidirectional information exchange is enabled, and the function of the interactive TV receiver 3 is extended.

That is, in the invention, by a third information transmitting function, completely independent of the main broadcast and existing teletext generated, displayed and outputted by the reception script, it is intended to extend the function of the interactive TV receiver 3, and the system is built up by connecting multiple interactive TV receivers 3 through public telephone lines. By such configuration of connecting multiple interactive TV receivers 3 to the server 4 through telephone lines, bidirectional information exchange function of receivers is further advanced, and according to the viewer's instruction, online information exchange not relating to the broadcast (for example, educational program, catalog request guide, merchandise purchase guide, mailing guide, ticket reservation guide, local program and other information exchange, and various information services) can be presented, and each information exchange can be done easily and selectively only by manipulation of the television remote controller.

That is, in this invention, it is intended to connect the interactive TV receiver 3 to the server 4 through a telephone line automatically, so that various information relating to the main broadcast or independent of the main broadcast can be exchanged by connecting the line automatically to the server 4 by simple manipulation of the television remote controller.

By constructing the information exchange mechanism by using the household television receiver as the medium, for example, various information exchange procedures about catalog request, merchandise purchase, mailing, ticket reservation, and educational system with scoring function can be done easily by simple manipulation of the television remote controller.

For example, by providing the server 4 with the subscriber database, the transaction processing function can be realized, relating to the main broadcast, or independently of the main broadcast, or not relating to the main broadcast at all, by executing the reception process of the merchandise designated by the viewer, and acquiring the address information of the viewer by retrieval of the subscriber database according to the identification information, so that varied transaction procedures of catalog request, merchandise purchase, mailing, ticket reservation and others can be done easily by simple manipulation of the television remote controller.

Or, by providing the server 4 with the subscriber database, disclosure function of information guide presented to the subscriber (disclosure of presented information guide menu), and information presenting function, it realizes, completely indifferent to broadcast, the transaction process function for executing the reception process of the merchandise specified by the viewer and acquiring the address information of the viewer by retrieval of the subscriber database according to the identification information, so that varied transaction procedures for catalog request, merchandise purchase, mailing, and ticket reservation can be done by simple manipulation of the television remote controller.

Also by providing the server 4 with the mail exchange and storing mechanism, mails can be exchanged between interactive TV receivers 3, completely indifferent to broadcast.

Moreover, by utilizing the mail exchange function by the interactive TV receiver 3 and server 4, not requiring dial operation or sound response at all (that is, not necessary to turn dial or talk), helper system or emergency report system for general household can be easily constructed.

FIG. 40 is a diagram showing an example of processing procedure in the interactive television system of the above broadcast non-related online type.

In FIG. 40, step S71 shows transmission process of requesting online information presentation not relating to the broadcast, by button operation of the television remote controller 308 by the viewer.

Step S72 shows the process of receiving the online information presentation request by button operation of the television remote controller 308 from the viewer, and transmitting the request to the server 4.

Step S73 shows the process of transmitting presented information guide menu from the server 4 to disclose the presented information guide to the viewer. Alternatively, a basic home menu may be stored in the ROM of the receiver 3 preliminarily, and it may be displayed in the CRT 32. In this case, the menu screen can be displayed promptly and adequately.

Step S74 shows the process of button operation of the television remote controller 308 by the viewer for selecting the information exchange service to receive information presentation from the presented information guide menu (for example, educational program presentation, catalog request guide, merchandise purchase guide, mailing guide, ticket reservation guide, local program presentation, mail exchange, home helper booking, use of registered main box (emergency report, etc.), hospital and other facility booking, and other information exchange service) by, for example, designation operation of a selector.

Step S75 shows the process of line connection of the request of information exchange service according to the selection data from the viewer to the server 4. Herein, by automatically dialing to the server 4 according to the telephone number information of the line connection destination stored in the communication control block [CCB] in the RAM mentioned later, the request of information exchange service according to the selection data from the viewer is transmitted.

Step S76 shows the process of presenting (transmitting) the data of information exchange service according to the request from the viewer to the demanding interactive TV receiver 3.

By this interactive information exchange function using the television as the medium, the viewer can receive, by simple button operation of the television remote controller 308, desired information exchange service (for example, educational program presentation, catalog request guide, merchandise purchase guide, mailing guide, ticket reservation guide, local program presentation, mail exchange, home helper booking, use of registered main box (emergency report, etc.), hospital and other facility booking, and other information exchange service).

Specifically, by providing the server 4 with, for example, a transaction processing function of executing the reception process of commodity designated by the viewer, and acquiring the address information of the ordering viewer by retrieval of subscriber database (local database (L-DB) 42A and master database (M-DB) 43A) according to the identification information, varied transaction procedures such as catalog request, merchandise purpose, mailing, and ticket reservation can be executed easily by simple manipulation of the television remote controller.

Also by providing the server 4 with the mail exchange and storing mechanism, mails can be exchanged between interactive TV receivers 3.

Moreover, by utilizing the mail exchange function by the interactive TV receiver 3 and server 4, not requiring dial operation or sound (voice) response at all, helper system or emergency report system for general household can be easily constructed.

The constitution of the parts in the interactive television system having online bidirectional function not relating to the broadcast is same as in the fifth embodiment, that is, the first embodiment, and detailed description is omitted (see FIG. 3).

The internal structure of the multimedia teletext receiver 33 and transmission timing of the control data in the sixth embodiment (script and screen control information) are also same as in the fifth embodiment, that is, the first embodiment, and detailed description is omitted (see FIGS. 4, 5, 6A and 6B).

An example of operation of the sixth embodiment is described below. The bidirectional information exchange service using the broadcast wave is explained in the fifth embodiment, and detailed description is omitted.

The information exchange service not relating to broadcast wave is described below.

First, the viewer operates button of the television remote controller 308 to request online information presentation not relating to broadcast (step S71 in FIG. 40).

The interactive TV receiver 3,when receiving the request of online information presentation by button operation of the television remote controller 308 from the viewer, transmits the request to the sever 4, by automatically dialing to the server 4 according to the telephone number information of the line connection destination stored in the communication control block [CCB] in the RAM 305 (step S72 in FIG. 40).

The server 4, when receiving the request of online information presentation by manipulation of the television remote controller 308 by the viewer, retrieves the local database (L-DB) 42A (or master database (M-DB) 43A) according to identification information to disclose the presented information guide to the viewer, and acquires the telephone number of the demanding viewer, and transmits the presented information guide menu to the demanding viewer (step S73 in FIG. 40).

At this time, if the private telephone number of the viewer is included in the information received from the interactive TV receiver 3, the process of acquisition of demanding viewer telephone number from the database is skipped, and the line is connected automatically by using the received telephone number.

The interactive TV receiver 3 displays the presented information guide menu on the display screen of the display unit (CRT) 32 according to the data received from the server 4.

On the presented information guide menu screen, the viewer operates the button of the television remote controller 308, and selects the desired information exchange service from the presented information guide menu (for example, educational program presentation, catalog request guide, merchandise purchase guide, mailing guide, ticket reservation guide, local program presentation, mail exchange, home helper booking, use of registered main box (emergency report, etc.), hospital and other facility booking, and other information exchange service) by, for example, designation operation of a selector (step S74 in FIG. 40).

At this time, on the presented information guide menu screen, as the viewer manipulates the direction command key of the television remote controller 308, the selected and designated selector is emphasized in display (for example, displayed by flickering), and the specified selector is clarified.

Furthermore, on this screen, when the "decision" key is manipulated, the selection content (request of information exchange service) of the viewer is transmitted to the server 4 (step S75 in FIG. 40).

The server 4, when receiving the request of information exchange service from the viewer, calls the information exchange service information according to the request from the local database (L-DB) 42A or master database (M-DB) 43A, and saves in the transfer data store buffer not shown, and transmits the information exchange service data according to the request to the demanding interactive TV receiver 3, thereby starting presentation of information exchange service (step S76 in FIG. 40).

At this time, depending on the content of the information exchange service (for example, presentation of pay TV program), the fee processing is started. That is, when presentation of information exchange service is started, in the subscriber database in the local database (L-DB) 42A or master database (M-DB) 43A, the feed control region of the database is updated and controlled, to the subscriber presented with the information exchange service, by transfer information quantity, simple time calculation, or package unit calculation.

In this way, the viewer of the interactive TV receiver 3 can receive information exchange service presented from the server 4 according to the request, through the medium of the TV receiver.

To terminate the use of this information exchange service, the viewer being presented with the information manipulates, for example, the "menu button" which instructs end of communication of the television remote controller 308, and the information exchange service is terminated, and the selection menu screen for information exchange having plural selectors appears again.

By the interactive information exchange function by using the general household television receiver as the medium and utilizing the public telephone line, in the system configuration easy to construct and distribute, extremely saving the user's cost, the viewer can receive desired information exchange service (for example, educational program, catalog request, merchandise purchase, mailing, ticket reservation, and local program presentation) by simple button operation of the television remote controller 308.

Specifically, by providing the server 4 with the transaction processing function for executing the reception process of the merchandise designated by the viewer, and acquiring the address information of the viewer by retrieval of the subscriber database (local database (L-DB) 42A, master database (M-DB) 43A) according to the identification information, varied transaction procedures of catalog request, merchandise purchase, mailing, ticket reservation and others can be done easily by simple manipulation of the television remote controller.

Or, by providing the server 4 with the transaction processing function for executing the reception process of the merchandise designated by the viewer, and acquiring the address (address, name, postal code, etc.) information of the demanding viewer by retrieval of the subscriber database according to the identification information, varied transaction procedures of catalog request, merchandise purchase, mailing, ticket reservation and others can be done easily by simple manipulation of the television remote controller.

Also by providing the server 4 with the mail exchange and storing mechanism, mails can be exchanged between interactive TV receivers 3.

Moreover, by utilizing the mail exchange function by the interactive TV receiver 3, not requiring dial operation or sound (voice) response at all, helper system or emergency report system for general household can be easily constructed.

Thus, the sixth embodiment constructs an online interactive television system, not relating to the broadcast, of high utility and excellent controllability for general household in an economically advantageous system configuration, by effectively utilizing the broadness in coverage and rapidity in reporting which are basic features of television broadcast, public telephone lines, etc., spread widely as the existing infrastructure.

In the described first to sixth embodiments, the control data, the transfer destination information and the telephone number information are included in a vertical blanking interval of the broadcasting wave. However, the video signal (the broadcasting wave) may includes the control data, the transfer destination information and the telephone number information in another position rather than the vertical blanking interval.

Additional advantages and modifications will readily occur to those skilled in the art. Therefore, the invention in its broader aspects is not limited to the specific details, and representative devices shown and described herein. Accordingly, various modifications may be without departing from the spirit or scope of the general inventive concept as defined by the appending claims and their equivalents.

What is claimed is:

1. A television system comprising:
   receiving means for receiving a video signal including control data carried in a vertical blanking interval of said video signal;
   means for identifying and separating the control data from the vertical blanking interval of the video signal received by said receiving means;
   storing means for storing the identified and separated control data;
   input means for inputting instructions from an operator;
   a display;
   first display control means for controlling the display to provide for displaying an additional information selection screen including indications of plural pieces of additional information relating to a presently ongoing television program carried by the received video signal and derived from the stored control data;

selection means responsive to an instruction input by said input means for selecting at least one of said plural pieces of additional information by selecting one of said indications of said plural pieces of additional information on said additional information selection screen;

second display control means for controlling the display to provide for displaying the selected at least one of said plural pieces of additional information selected by the selection means;

a read-only memory for storing a script interpreter executing an interactive procedure and character font information; and wherein said first and second display control means execute the stored control data by using the script interpreter in order to access the character font information to control the displaying of information on said display.

2. The television system according to claim 1, wherein said input means includes:

a remote controller having at least one operation button to be manipulated by the operator, and means for outputting a signal corresponding to manipulation of the operation button as the instruction, and a remote control receiver for receiving the signal output by the remote controller.

3. The television system according to claim 1, further comprising:

a memory;

means for storing information displayed on said display into said memory in response to a storage instruction input by said input means; and means for redisplaying the information stored in said memory on said display in response to a redisplay instruction input by said input means.

4. The television system according to claim 1, wherein the selected at least one of said plural pieces of said additional information includes a question relating to the particular television program and the input means includes a means for inputting an answer to the question, said television system further comprising:

determining means for determining whether the answer input by said input means is correct or not according to the stored control data; and means for displaying a result of the determining by said determining means on said display.

5. The television system according to claim 4, wherein the control data further includes timing data relative to the particular television program, and said determining means controls the displaying of the result of determining on said display in accordance with the timing data.

* * * * *